United States Patent
Cho et al.

(10) Patent No.: US 9,342,773 B2
(45) Date of Patent: May 17, 2016

(54) LABEL FOR PRODUCT AUTHENTICATION, METHOD FOR GENERATING AUTHENTICATION CODE OF LABEL, METHOD AND SYSTEM FOR AUTHENTICATING LABEL, PORTABLE TERMINAL FOR AUTHENTICATING LABEL, AND COMPUTER-READABLE RECORDING MEDIUM FOR AUTHENTICATING LABEL

(71) Applicants: Han Yong Cho, Yongin-si (KR); Jae Wook Chun, Seoul (KR); Myung Ho Kang, Seoul (KR)

(72) Inventors: Han Yong Cho, Yongin-si (KR); Jae Wook Chun, Seoul (KR); Myung Ho Kang, Seoul (KR)

(*) Notice: Subject to any disclaimer, the term of this patent is extended or adjusted under 35 U.S.C. 154(b) by 0 days.

(21) Appl. No.: 14/399,580
(22) PCT Filed: May 7, 2013
(86) PCT No.: PCT/KR2013/003953
§ 371 (c)(1),
(2) Date: Nov. 7, 2014
(87) PCT Pub. No.: WO2013/168962
PCT Pub. Date: Nov. 14, 2013

(65) Prior Publication Data
US 2015/0090777 A1 Apr. 2, 2015

(30) Foreign Application Priority Data

May 7, 2012 (KR) .................. 10-2012-0048162
Sep. 11, 2012 (KR) .................. 10-2012-0100380

(51) Int. Cl.
*G06F 17/00* (2006.01)
*G06K 15/00* (2006.01)
(Continued)

(52) U.S. Cl.
CPC ........ *G06K 19/06056* (2013.01); *G06K 7/1417* (2013.01); *G06K 7/1434* (2013.01); *G06K 9/00577* (2013.01); *G06K 19/06037* (2013.01); *G06Q 30/0185* (2013.01); *G06K 19/06093* (2013.01)

(58) Field of Classification Search
USPC .......................... 235/375, 383, 454, 457, 494
See application file for complete search history.

(56) References Cited

U.S. PATENT DOCUMENTS

4,794,237 A * 12/1988 Ferrante .................. 235/462.34
5,486,933 A *  1/1996 Shindo et al. ................. 359/2
(Continued)

FOREIGN PATENT DOCUMENTS

GB    2304077 A    3/1997
GB    2324065 A    10/1998
(Continued)

OTHER PUBLICATIONS

International Search Report for International Application No. PCT/KR2013/003953.

*Primary Examiner* — Tuyen K Vo
(74) *Attorney, Agent, or Firm* — LRK Patent Law Firm

(57) ABSTRACT

A product authentication label includes a carrier layer made of a transparent or translucent material, a plurality of first reflection pattern forming bodies disposed in the carrier layer and configured to reflect a substantially identical reflection pattern regardless of the direction of irradiated light, and a plurality of second reflection pattern forming bodies randomly disposed in the carrier layer and configured to reflect a reflection pattern which varies depending on the direction of irradiated light.

34 Claims, 19 Drawing Sheets

(51) Int. Cl.
*G06K 7/10* (2006.01)
*G06K 19/06* (2006.01)
*G06K 7/14* (2006.01)
*G06Q 30/00* (2012.01)
*G06K 9/00* (2006.01)

(56) References Cited

U.S. PATENT DOCUMENTS

| | | |
|---|---|---|
| 2003/0014647 A1 | 1/2003 | Bourrieres et al. |
| 2004/0121241 A1* | 6/2004 | Kodama ............................ 430/1 |
| 2006/0022059 A1* | 2/2006 | Juds ............................... 235/494 |
| 2006/0275671 A1* | 12/2006 | Eto et al. ........................... 430/1 |
| 2007/0170257 A1 | 7/2007 | Haraszti |
| 2009/0273451 A1* | 11/2009 | Soppera et al. ............... 340/10.4 |
| 2009/0310195 A1* | 12/2009 | Suzuki et al. ..................... 359/2 |
| 2010/0060987 A1* | 3/2010 | Witzman et al. ............... 359/589 |
| 2010/0179914 A1* | 7/2010 | Levin et al. .................... 705/318 |

FOREIGN PATENT DOCUMENTS

| | | |
|---|---|---|
| KR | 10-1113035 B1 | 2/2012 |
| WO | 98-45826 A1 | 10/1998 |

* cited by examiner

LABEL FOR PRODUCT AUTHENTICATION, METHOD FOR GENERATING AUTHENTICATION CODE OF LABEL, METHOD AND SYSTEM FOR AUTHENTICATING LABEL, PORTABLE TERMINAL FOR AUTHENTICATING LABEL, AND COMPUTER-READABLE RECORDING MEDIUM FOR AUTHENTICATING LABEL

TECHNICAL FIELD

The present invention relates to a security technology for preventing copying of an article and, more particularly, to a label for product authentication, a method for generating an authentication code of a label, a method and system for authenticating a label, a portable wireless terminal for authenticating a label, and a computer-readable recording medium for authenticating a label.

BACKGROUND ART

A variety of technologies for preventing copying of a banknote, a credit card or a high-priced article is known in the art. Among these technologies, there is a method in which a hard-to-copy label is affixed to an article to be protected from copying and in which the copying or non-copying of the article is indirectly determined by determining the copying or non-copying of the label. For example, a label printed with a special ink or a label printed with a hologram is affixed to a high-priced article, a credit card, a banknote or a passport. The authenticity of an article such as a credit card or the like is indirectly determined by determining the authenticity of a label affixed thereto. Since the label is designed to be broken when separated from the article, the authenticity of the label-affixed article can be indirectly guaranteed through the use of the label. The label used for this purpose is referred to as a product authentication label.

The product authentication label can be used in case where it is more difficult to copy a label than to copy a product. In reality, most of the labels developed thus far can be copied. Thus, a demand has existed for a hard-to-copy security label. In order for a security label for the indirect determination of copying or non-copying of an article to be commercially used, the security label should comply with the following conditions.

1. A label should have substantially unique physical features which are distinguishable from other labels. This is because, if a label has unique physical features, it is possible to assure the uniqueness of an article to which the label is affixed.

2. It is required that the physical features of the label can be extracted with ease and the extracted physical features can be easily converted to a digital identification code which permits determination of authenticity. The similarity of the converted digital identification code should be assured such that the authenticity of a label can be determined even if the extraction (reading) conditions of the physical features are changed within a specified range depending on the device.

3. In a label manufacturing factory, it should be technically difficult to manufacture a label having the same physical features such that a manufacturer gives up an attempt to copy the same label as the previously manufactured one. This reliably assures the uniqueness of a label-affixed article.

4. It should be difficult and extremely costly to copy a label. The cost required in copying a label should overwhelm the benefit obtained by copying the label. Copying should be difficult and costly such that one gives up an attempt to copy a label.

5. A method for reading physical features of a label should be trustworthy and a device for reading physical features of a label should be inexpensive. The cost required in manufacturing a label and determining the copying or non-copying of a label should be quite low such that the benefit obtained by affixing a label is greater than the loss occurring when a security label is not used.

GB 2 304 077 A discloses a label that satisfies some of the aforementioned conditions. The label (security device) disclosed in GB 2 304 077 A includes a plurality of reflective particles randomly distributed in a substrate made of a synthetic resin or a coating layer. The reflective particles are metallic flakes or reflection-coated granules which have a plurality of reflective surfaces. It is preferred that the reflective particles are not spheroids. Thus, the light incident on the label in a specified direction is reflected in a predetermined direction depending on the distribution position and posture of the reflective particles. A reflection pattern or a reflection signal is received using a camera or an optical sensor. The reflective particles are put into a bulk-type synthetic resin and are stirred and randomly mixed. The mixture is injection-molded into a card. For that reason, the distribution position and posture of the reflective particles are randomly decided. The probability that labels identical in the position and posture of particles are manufactured is extremely low. Accordingly, each of the labels thus manufactured is unique in terms of the probability. The pattern of the light reflected from the label including the reflective particles having a unique position and posture is also unique. The unique pattern of the reflected light is used as a label identification code.

However, the label disclosed in GB 2 304 077 A fails to satisfy the second condition required in a label. The label disclosed in GB 2 304 077 A includes particles each having a plurality of reflection surfaces and exhibits a physical feature that the light irradiated in a specific direction is reflected or not reflected depending on the position and posture of the particles. However, the label is very sensitive to the physical feature reading conditions (e.g., the direction or intensity of incident light and the position of a camera or an optical sensor for receiving reflected light). Even if the condition is changed a little bit, the label exhibits a completely different reflection feature. That is to say, even in the same label, the light reflection pattern taken by a camera or the signal obtained through an optical sensor shows a great change depending on the slight change in the light irradiation angle or the slight change in the position of the camera or the optical sensor. Particularly, in case where the label is affixed to a credit card or an article, different reflection patterns are obtained even in the same label if the position of a light source or a camera of a reader device installed at different locations is changed only a little bit. This makes it impossible to determine the authenticity of the label. The reflection patterns of all the security labels using particles having a plurality of angled surfaces are extremely sensitively changed depending on the change in the position of a light source or a camera. Thus, the security labels are hard to assure the reliability of authenticity determination and are not commercially available thus far.

GB 2 324 065 A discloses a label in which a plurality of visually distinguishable beads is randomly distributed in a matrix made of a synthetic resin. The information on the positions of beads existing in the label is read by an optical reader. The information is coded and stored in a database. The label affixed to an article is scanned by an optical reader, thereby reading the positions of beads. The copying or non-copying of the article is verified by comparing the positions of beads with the stored codes. The beads reflect the light coming from all directions. This provides an advantage in that the two-dimensional positions of the beads within the matrix can be accurately grasped using the image of the label taken by the camera.

However, the label disclosed in GB 2 324 065 A suffers from a problem in that the label can be copied with ease. Even if the beads are three-dimensionally and randomly distributed within the matrix, it is possible to easily copy the label in case where only the two-dimensional positions (the X and Y coordinates on a plane) of the beads are used as identification codes. By imaging a genuine label with a camera, the arrangement positions of the beads can be identified through the use of an image processing technique. The label can be perfectly copied by two-dimensionally arranging the beads through the use of a precision machine and then fixing the beads with a synthetic resin. Alternatively, a copied label can be easily manufactured by imaging a genuine label with a camera and then outputting the imaged two-dimensional pattern with a precision printer. In case of authenticating a label only with a machine, a reader installed in the machine reads the same image as the genuine label from a printed label but cannot distinguish the printed label from the genuine label. For example, a machine such as an ATM (Automatic Teller Machine) or the like provided with a camera as a reader cannot distinguish a credit card having a printed label from a credit card having a genuine label.

US 2007/0170257 A1 discloses a method for determining whether particles having a light reflection property are three-dimensionally distributed in a label. The particles are three-dimensionally and randomly distributed in a carrier layer. The particles are in the form of glass beads or balls or in the form of discs. The method disclosed in US 2007/0170257 A1 is directed to a method for distinguishing a label copied by imaging a label containing particles such as glass beads or the like and printing the imaged label from a genuine label having three-dimensionally distributed glass beads.

In the method disclosed in US 2007/0170257 A1, the position of a camera is fixed. Three label images are obtained using light sources installed at different positions. Based on an image obtained by combining the three images, it is determined whether the particles are three-dimensionally distributed. The light sources installed at different positions are turned on to irradiate light on a label. Three label images are taken by a camera. The reflection angle of the light irradiated on the glass beads varies depending on the positions of the light sources. Thus, the three images are taken as if the positions of the particles are slightly moved. In case where the three images taken as if the positions of the particles are slightly moved are combined, a geometric artifact appears in the combined image. If the geometric artifact exists in the combined image, it is determined that the label is a genuine label. If the geometric artifact does not exist in the combined image, the particles are not three-dimensionally distributed. It is therefore determined that the label is copied label. This method is applicable because the glass beads have a property of reflecting the light irradiated in all directions.

The method disclosed in US 2007/0170257 A1 is capable of distinguishing a printed label from a genuine label having a three-dimensional structure. However, the method cannot distinguish a label copied so as to have a three-dimensional structure from a genuine label. For example, in case where material capable of causing light interference is coated on a photograph obtained by printing an image taken with a camera such that the angle of the reflected light varies depending on the positions of light sources, there is a possibility that the method cannot distinguish the copied label from a genuine label.

Furthermore, in case where a three-dimensional label is copied by reading two-dimensional coordinates of particles from a image taken with a camera, disposing particles at two-dimensional coordinate positions through the use of a precision machine and fixing the particles with a synthetic resin, there is a problem in that it is impossible to distinguish the copied label from a genuine label.

SUMMARY OF THE INVENTION

Technical Problems

In order to prevent copying of an identification card, a banknote, a document, a medicine, a high-priced article and the like, a hard-to-copy product authentication label to be affixed to these products is required in the market. Moreover, there is required a product authentication label which can be manufactured in a cost-effective manner and which can be authenticated at a low cost to reliably check copying or non-copying of a product. The present invention is conceived to comply with such a market need.

It is a first object of the present invention to provide a novel product authentication label capable of preventing copying of a product. The present invention provides a novel hard-to-copy product authentication label with unique physical features, which makes it possible to easily and stably extract the unique physical features and to extract an authentication code capable of verifying authenticity of a product in different devices.

A second object of the present invention is to provide a method for generating an authentication code of a product authentication label. The present invention provides a method for stably generating an authentication code for product authentication using two different images of a product authentication label containing particles differing in reflection property.

A third object of the present invention is to provide a method for authenticating a product authentication label. The present invention provides a method which can easily determine the authenticity of a label by generating an authentication code from a plurality of label images taken with a camera and comparing the generated authentication code with a registration authentication code.

A fourth object of the present invention is to provide a system for authenticating a product authentication label using a label authentication method.

A fifth object of the present invention is to provide a portable terminal for authenticating a product authentication label. If a product authentication label is authenticated using a portable terminal in place of a dedicated label reader for a product authentication label, it is possible to reduce a label authentication cost.

A sixth object of the present invention is to provide a computer-readable recording medium which stores a program for executing a method for authenticating a product authentication label.

Technical Solutions

First Invention

Product Authentication Label

According to one aspect of the present invention, there is provided a product authentication label. The product authentication label according to the present invention includes a carrier layer made of a transparent or translucent material, a plurality of first reflection pattern forming bodies disposed in the carrier layer and configured to reflect a substantially identical reflection pattern regardless of the direction of irradiated light, and a plurality of second reflection pattern forming bodies randomly disposed in the carrier layer and configured to reflect a reflection pattern which varies depending on the direction of irradiated light. The first reflection pattern forming bodies make sure that, when imaging the label with a camera, a substantially identical reflection pattern (image) is taken by the camera regardless of the direction of irradiated light or regardless of the imaging direction of the camera with respect to the label. The second reflection pattern forming bodies ensure that, when imaging the label with a camera, different reflection patterns (images) are taken by the camera depending on the direction of irradiated light or the imaging direction of the camera with respect to the label. The first reflection pattern forming bodies may be disposed randomly or artificially. However, the second reflection pattern forming bodies are randomly disposed at all times.

In one preferred embodiment, the first reflection pattern forming bodies may include a plurality of first reflection particles randomly disposed in the carrier layer, each of the first reflection particles having a smooth surface. The second reflection pattern forming bodies may include a plurality of second reflection particles disposed in the carrier layer, each of the second reflection particles having a plurality of reflection surfaces formed so as to reflect light is a specific direction. Each of the first reflection particles has a smooth surface so as to reflect the light irradiated in all directions. Each of the second reflection particles has a plurality of reflection surfaces so as to reflect the light irradiated in a specified direction. The carrier layer is formed by mixing the first reflection particles and the second reflection particles with a liquid synthetic resin and then curing the mixture. The carrier layer is formed into a sheet-like shape. The carrier layer is preferably made of a thermosetting resin or a UV-curable synthetic resin which can be sprayed on a product or can be coated on a product. The first reflection particles may be silver-coated glass beads or synthetic resin beads. The second reflection particles may be silver-coated glass flakes or synthetic resin flakes. The product authentication label may be formed into a substrate having a thickness of 100 to 600 urn or a transparent thin film by putting the first reflection particles and the second reflection particles into a liquid synthetic resin, uniformly mixing them and extruding or injecting the mixture.

In one preferred embodiment, the first reflection pattern forming bodies may include a plurality of ink layers disposed on one surface of the carrier layer in the form of dots. The second reflection pattern forming bodies may include a plurality of second reflection particles disposed in the carrier layer, each of the second reflection particles having a plurality of reflection surfaces formed so as to reflect light in a specific direction. The dot-shaped ink layers can be formed by spraying an ink on one surface of the carrier layer such that the ink layers are randomly distributed. However, the present invention is not limited thereto. Coordinates at which small dots are to be printed may be generated at random numbers. Ink dots may be printed at the coordinates by a inkjet printer. The second reflection particles may be flake-shaped glass particles whose surfaces are coated with silver. The product authentication label according to the present embodiment can be manufactured by injecting, extruding or spraying a synthetic resin mixed with the second reflection particles and forming a printed layer on one surface of a cured synthetic resin. The length of the long sides of the first reflection particles may preferably be in a range of 100 to 300 m. The diameter of the ink layers may preferably be in a range of 100 to 500 μm. The ink layers can be formed on the surface of the carrier layer by a marbling method.

The product authentication label according to the present invention may further include a transparent synthetic resin film attached to one surface of the carrier layer and a label identification code layer laminated on one surface of the film on which the carrier layer is attached, the label identification code layer disposed so as to surround at least a portion of the carrier layer. The label identification code layer includes a reference region which indicates a reference point of a taken image, an identification code region which indicates identification information including information on a product and information on a manufacturer, and a plurality of division reference points which indicates reference points of division lines for dividing the carrier layer into a virtual grid shape. A pattern which indicates label reference points is formed in the reference region of the label identification code layer, and a two-dimensional pattern which codes the label identification information is formed in the identification code region. The two-dimensional pattern of the label identification code layer can be formed into a black-white rectangular pattern by inkjet printing. Alternatively, the two-dimensional pattern of the label identification code layer may be formed by coating an ink on a film and laser-marking a black-white rectangular pattern.

A label including only the particles having a plurality of reflection surfaces, e.g., metal sheets or glass sheets, or only the particles having a plurality of angled reflection surfaces, e.g., metal flakes or glass flakes, has an advantage in that it is extremely difficult to copy the label. This is because, when imaging the label, images having different reflection patterns are taken depending on the change in the imaging conditions, e.g., the irradiation angle of light and the imaging direction of a camera. It is technically quite difficult to copy a label whose reflection pattern images varying changed depending on the imaging conditions are similar to one another. However, if the imaging conditions are changed even a little bit each time when an image is taken by a camera, the pattern of the obtained image is also changed. Thus, the aforementioned label is not suitable for use as a product authentication label. In order to authenticate a product, it is required that similar mutually-comparable reflection pattern images be always taken despite the change in the imaging conditions. This cannot be assured by the aforementioned label.

A label including only the reflection particles, e.g., glass beads, each having a smooth surface which reflects the light irradiated in all directions, has an advantage in that similar reflection pattern images can be obtained even if the imaging conditions are changed a little bit when taking a reflection pattern image of the label with a camera. Accordingly, even if the imaging conditions are changed to some extent, the authenticity of the label can be determined by comparing the similar reflection pattern images. However, the label including only the reflection particles, e.g., glass beads, which reflect the light irradiated in all directions is not suitable for used as a product authentication label because a label having the same reflection pattern can be easily copied by printing a reflection pattern image taken with a camera.

The product authentication label according to the present invention includes a plurality of first reflection pattern forming bodies configured to reflect a substantially identical reflection pattern regardless of the direction of irradiated light and a plurality of second reflection pattern forming bodies randomly disposed in the carrier layer and configured to reflect a reflection pattern which varies depending on the direction of irradiated light. The reflection pattern image of the label obtained by the first reflection pattern forming bodies provides an identical reflection pattern regardless of the imaging conditions. Thus, the reflection pattern image of the label obtained by the first reflection pattern forming bodies is used to determine the authenticity of the label. The reflection pattern image of the label obtained by the second reflection pattern forming bodies provides a reflection pattern which varies depending on the imaging conditions. Thus, the reflection pattern image of the label obtained by the second reflection pattern forming bodies is mainly used to determine copying or non-copying of the label although it can be used to determine the authenticity of the label. The second reflection pattern forming bodies are randomly disposed and are formed of the particles whose reflection pattern varies depending on the imaging conditions. It is therefore extremely difficult to copy the label containing the second reflection pattern forming bodies. As set forth above, the product authentication label according to the present invention includes different kinds of reflection pattern forming bodies having different reflection properties. This makes it difficult to copy the label and makes it possible to stably extract an authentication code for the authentication of a product even when the imaging conditions are changed to some extent. These features will be described in detail based a method for generating an authentication code of a product authentication label and a method for authenticating a product authentication label.

Second Invention

Method for Generating an Authentication Code of a Product Authentication Label

According to another aspect of the present invention, there is provided a method for generating an authentication code of a product authentication label including a plurality of first reflection pattern forming bodies configured to reflect a substantially identical reflection pattern regardless of the direction of irradiated light and a plurality of second reflection pattern forming bodies randomly disposed and configured to reflect a reflection pattern which varies depending on the direction of irradiated light.

The authentication code of the product authentication label is obtained by extracting and coding the physical property unique to the label which makes it possible to distinguish a specific label from another label. Thus, the authentication code needs to be unique. Furthermore, it should be technically quite difficult to replicate a label having to same authentication code.

In one preferred embodiment, the product authentication label according to the present invention includes a plurality of first reflection pattern forming bodies and a plurality of second reflection pattern forming bodies which are randomly disposed and which differ in reflection property from each other. The first reflection pattern forming bodies are first reflection particles including silver-coated glass beads or synthetic resin beads. The second reflection pattern forming bodies are second reflection particles including silver-coated glass flakes or synthetic resin flakes. In case of taking an image of the label with a camera, the image thus taken is a combined image of a reflection pattern obtained by the first reflection particles and a reflection pattern obtained by the second reflection particles. Thus, it is possible to obtain an image having a reflection pattern which varies with the imaging conditions at all times. In the reflection pattern image of the label, the reflection pattern of the first reflection particles is a similar reflection pattern which shows little change depending on the imaging conditions. The reflection pattern of the second reflection particles is a reflection pattern which varies with the imaging conditions at all times. The reflection patterns exhibit the positions of the first reflection particles and the second reflection particles in the label. The first reflection particles and the second reflection particles are randomly disposed within the label. Therefore, if the positions of the reflection particles in the label are coded, it is possible to obtain a code unique to the label and to assure the uniqueness of the label. The second reflection particles provide an image having a reflection pattern which varies depending on the label imaging conditions, thereby making it difficult to replicate the label. In particular, the second reflection particles contained in the label exhibit a unique reflection pattern depending on the direction of the reflection surfaces as well as the positions of the second reflection particles. This makes it even more difficult to replicate a label having the same reflection pattern.

Accordingly, the position information of the first reflection particles and the second reflection particles can be used as an authentication code for determining the authenticity of the label. In case where both the position information of the first reflection particles and the position information of the second reflection particles are extracted and used as an authentication code, different reflection pattern images are taken at all times if the reflection pattern imaging conditions are changed due to the second reflection particles irregularly reflecting light. Thus, the reference reflection pattern image and the compared reflection pattern image differ from each other. This makes it difficult to identify an identical genuine label. That is to say, the authenticity of the label cannot be determined by comparing the authentication code (registration authentication code) generated from the particle position information extracted from the reflection pattern image taken for the purpose of registration and the authentication code (test authentication code) extracted from the reflection pattern image taken for the purpose of authenticity determination.

The present invention provides a method for generating an authentication code by extracting the position information of the reflection particles satisfying specific conditions instead of extracting the position information of all the reflection particles contained in the label. The present invention provides a method for generating an authentication code which can be used for product authentication even if the authentication code slightly differs from a registered authentication code when extracting the particle position information for the label authentication.

The authentication code of the label generated by the present method includes the position information of a plurality of first reflection pattern forming bodies and the position information of a plurality of second reflection pattern forming bodies which appear in two mutually-different reflection pattern images. In one preferred embodiment, the first reflection pattern forming bodies are first reflection particles including silver-coated glass beads or synthetic resin beads. The second reflection pattern forming bodies are second reflection particles including silver-coated glass flakes or synthetic resin flakes. Each of the first reflection particles has a smooth surface so as to reflect the light irradiated in all directions. Each of the second reflection particles has a plurality of reflection surfaces so as to reflect the light irradiated in a specified direction.

The authentication code of the label generated by the present method includes the position information of equal reflection particles and the position information of biased reflection particles which are extracted from two mutually-different images of the label. The equal reflection particles mean reflection particles which are included in both of two mutually-different reflection pattern images of a label with the difference in brightness between the reflection particles of the two images falling within a predetermined range. The biased reflection particles mean reflection particles which are included in only one of two mutually-different reflection pattern images of a label with the brightness of the reflection particles being equal to or greater than a predetermined value, or reflection particles which are included in both of two mutually-different reflection pattern images of a label with the difference in brightness between the reflection particles of the two images being equal to, or greater than a predetermined value.

Color and brightness information corresponding to the pixels of a camera is included in a digital image obtained by imaging a label. When imaged by a digital camera, most of the spherical first reflection particles are included in both of two mutually-different images of a label regardless the position of the camera due to the features of the first reflection particles. Furthermore, the change in the brightness of the first reflection particles in the two mutually-different images is relatively small due to the features of the first reflection particles. In contrast, the second reflection particles such as flakes or the like having a plurality of reflection surfaces are included in both of two mutually-different images of a label, or included in only one of the two images, or not included in any of the two images, depending on the position of a camera facing toward a label. In case where the second reflection particles are included in both of the two images, the change in the brightness of the second reflection particles in the two images is larger than that of the spherical first reflection particles. This is because the two images are taken at different camera positions and because the angles of the reflection surfaces of the second reflection particles facing toward the camera are changed depending on the change in the position of the camera (or the change in the position of a light source) with respect to the second reflection particles existing at specified positions of the label. Due to the aforementioned reflection properties of the reflection particles contained in the label, most of the equal reflection particles found by comparing two mutually-different images of the label are the first reflection particles. Most of the biased reflection particles are the second reflection particles. Depending on the imaging conditions, the position information of the second reflection particles may be included in the position information of the equal reflection particles. The position information of the first reflection particles may be included in the position information of the biased reflection particles. The number of the position information of the second reflection particles included in the position information of the equal reflection particles and the number of the position information of the first reflection particles included in the position information of the biased reflection particles can be controlled so as to become equal to or smaller than a statistically-set value by appropriately selecting the combinations of the respective particles.

In order to generate the authentication code of the product authentication label according to the present invention, two mutually-different reflection pattern images are first obtained by imaging the label with a camera. The reflection pattern images can be obtained by imaging the label with the position of a light source with respect to the label changed, or imaging the label with the position of the camera with respect to the label changed, or imaging the label by two cameras installed at different positions. The first reflection particles such as glass beads or the like having a smooth surface reflect the light irradiated in all directions. Thus, most of the first reflection particles are included in the respective images regardless of the arrangement position of the camera or the light source with respect to label. In contrast, the second reflection particles such as sheets or flakes having a plurality of reflection surfaces reflect the irradiated light in a specified direction. Thus, the second reflection particles may be included or not included in the respective images depending on the arrangement position of the camera or the light source with respect to label. Accordingly, the second reflection particles may be included in both of two reflection pattern images, or included in only one of the two reflection pattern images, or not included in any of the two reflection pattern images.

Next, the two mutually-different reflection pattern images thus taken are normalized. The reason for normalizing the two images is to compare the brightness of the particles included in the two images taken under different imaging conditions. Even if the label is imaged at the same position, the size and brightness of the reflection pattern images thus taken may vary depending on the surrounding environment such as vibration, illumination or the like. In order to compare the two reflection pattern images differing in brightness and size from each other, the images are converted to images having a relative value with respect to the same reference value.

Next, a difference in brightness between grid coordinates corresponding to the normalized images is found. A first code value that classifies the grid coordinates into equal reflection regions is given to the grid coordinates if the difference in brightness falls within a predetermined value range. A second code value that classifies the grid coordinates into biased reflection regions is given to the grid coordinates if the difference in brightness is larger than a predetermined value. For example, code value 1 may be given to the grid coordinates classified into the equal reflection region and code value −1 may be given to the grid coordinates classified into the biased reflection region. The grid coordinates are set by dividing the normalized images into a plurality of grids and giving coordinates to the divided grids. It is preferred that the size of one grid is set to become similar to the size of each of the reflection particles. For that reason, a plurality of camera pixels may be included in one grid. If the resolution of a camera is low, grids and pixels may be in a one-to-one correspondence relationship. In case where the normalized images are divided into grids, each of the normalized images may be divided in a rectangular grid shape by dividing the longitudinal and transverse sides of each of the normalized images at a predetermined interval. However, the present invention is not limited thereto. The grid coordinates may be given by finding the sizes and positions of the particles from the normalized images and dividing each of the normalized images into grids each having a predetermined size about the position of each of the particles. The grid coordinates may be set by dividing each of the normalized images into circles each having a predetermined radius about the position of each of the particles. Moreover, the grid coordinates may be set by dividing each of the normalized images into rectangular grids each having a predetermined length about the position of each of the particles.

The method for generating an authentication code of a product authentication label according to the present invention may further include a step of giving a code value that classifies the grid coordinates into a blank particle region to the grid coordinates if all the brightness values of the grid coordinates corresponding to the normalized images are equal to or smaller than a predetermined value. The code value for the blank particle region is 0. The method for generating an authentication code of a product authentication label according to the present invention may further include a step of giving a code value that classifies the grid coordinates into a biased reflection region to the grid coordinates if the difference in brightness between the grid coordinates corresponding to the normalized images falls within a predetermined range and if all the brightness values of the grid coordinates corresponding to the normalized images are equal to or smaller than a threshold value.

While the method for generating an authentication code of a product authentication label according to the present invention makes used of two mutually-different reflection pattern images, the present invention is not limited thereto. An authentication code may be generated in the same manner through the use of three mutually-different reflection pattern images. That is to say, an authentication code of a label may be generated by classifying the grid coordinates into an equal reflection region if the difference in brightness between the grid coordinates corresponding to the three reflection pattern images falls within a predetermined range, and classifying the grid coordinates into a biased reflection region if the difference in brightness between the grid coordinates corresponding to the three reflection pattern images does not fall within the predetermined range. If the number of the images used in generating the authentication code is increased, it is possible to generate an authentication code less sensitive to the change in imaging conditions and to assure the stability of authentication. However, a prolonged period of time is required in calculation.

The method for generating an authentication code of a product authentication label according to the present invention is configured to generate an authentication code using the difference in brightness between grid coordinates of two images taken under different imaging conditions. This makes it possible to generate an authentication code less sensitive to the change in the imaging conditions. That is to say, an authentication code of a label including first reflection pattern forming bodies less sensitive to the change in the imaging conditions and second reflection pattern forming bodies sensitive to the change in the imaging conditions is generated using the difference in brightness between grid coordinates of two images. For that reason, it is possible to generate an authentication code having label features which can be compared even if the imaging conditions are changed. Description will now be made on a method for authenticating a product authentication label using the authentication code generated as above.

Third Invention

Method for Authenticating a Product Authentication Label

According to another aspect of the present invention, there is provided a method for authenticating a product authentication label including a plurality of first reflection pattern forming bodies configured to reflect a substantially identical reflection pattern regardless of the direction of irradiated light and a plurality of second reflection pattern forming bodies randomly disposed and configured to reflect a reflection pattern which varies depending on the direction of irradiated light.

The method for authenticating a product authentication label according to the present invention includes a step of taking a plurality of mutually-different registration images of the label and generating a registration authentication code for the registration images, a step of taking a plurality of mutually-different test images of the label and generating a test authentication code for the test images, and a step of comparing the registration authentication code with the test authentication code, calculating the number of grid coordinates having a coincident first code value, and determining the label to be a genuine label if the number of grid coordinates having a coincident first code value falls within a predetermined value range. In this regard, the registration authentication code and the test authentication code are generated by the second invention mentioned above. That is to say, the registration authentication code is generated by finding a difference in brightness between grid coordinates corresponding to two mutually-different registration images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value. Furthermore, the test authentication code is generated by finding a difference in brightness between grid coordinates corresponding to two mutually-different test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value.

The method for authenticating a product authentication label according to the present invention may further include a step of comparing the registration authentication code with the test authentication code, calculating the number of grid coordinates having a coincident second code value, and determining the label to be a genuine label if the number of grid coordinates having a coincident second code value falls within a predetermined value range. In this regard, the second code value is a code value of the grid coordinates classified into the biased reflection regions. In the label authentication, if the number of the biased reflection regions having coincident grid coordinates is found, it is possible to increase the security level of label authentication.

The method for authenticating a product authentication label according to the present invention requires at least four reflection pattern images, including two reflection pattern images for use in generating the registration authentication code and two reflection pattern images for use in generating the test authentication code to be compared with the registration authentication code. In case where the registration authentication code is generated using three mutually-different reflection pattern images, it is preferable to generate the test authentication code using three mutually-different reflection pattern images and to compare the test authentication code with the registration authentication code. However, the present invention is not limited thereto. For example, the registration authentication code may be generated using four mutually-different reflection pattern images and the test authentication code may be generated using two mutually-different reflection pattern images. In this case, the number of the first codes of the registration authentication code is always equal to or smaller than the number of the first codes of the test authentication code.

In the method for authenticating a product authentication label according to the present invention, it is preferred that the number of the mutually-different registration images and the number of the mutually-different test images are equal to each other and further that the registration images and the test images corresponding to each other are taken under the same arrangement conditions of the camera with respect to the label. If the registration images and the test images taken under the same conditions are used, the fluctuation range of the equal reflection particles and the biased reflection particles included in the same grid coordinates can be narrowed when comparing the registration authentication code with the test authentication code. This makes it possible to increase the security level of label authentication. The arrangement conditions of the camera with respect to the label used when taking the registration images and the test images include the distance between the label and the camera and the tilt angle of the camera with respect to the label.

In one preferred embodiment, the test authentication code may be generated by taking only one test image and selecting one of the registration images. In case where only one test image is taken, it is possible to shorten the time required in label authentication.

Fourth Invention

System for Authenticating a Product Authentication Label

According to another aspect of the present invention, there is provided a system for authenticating a product authentication label. The label to be authenticated by the present system includes a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code. In one preferred embodiment, the label may include a carrier layer made of a transparent or translucent material, a plurality of first reflection particles randomly disposed in the carrier layer and configured to reflect the light irradiated in all directions, a plurality of second reflection particles randomly disposed in the carrier layer and configured to reflect the light irradiated in a specified direction, and a label identification code.

The present system includes: a label registration device including a first camera and an image processing module for generating a registration authentication code by processing a plurality of mutually-different registration images of the label taken with the first camera; a label reader including a second camera, an image processing module for generating a test authentication code by processing a plurality of mutually-different test images of an arbitrary label taken with the second camera, and a display unit for displaying a label authentication result; and a label authentication server.

The label authentication server is configured to perform: a step of receiving a label identification code and a registration authentication code of the label from the label registration device and storing the label identification code and the registration authentication code in a database; a step of receiving a label identification code and a test authentication code of an arbitrary label from the label reader and receiving a label authentication request from the label reader; a step of confirming whether the label identification code of the arbitrary label received from the label reader is the label identification code registered in the database; a step of, with respect to the label identification code whose registration is confirmed, comparing the registration authentication code with the test authentication code, calculating the number of grid coordinates having a coincident first code value, determining the label to be a genuine label if the number of grid coordinates having a coincident first code value falls within a predetermined value range, and determining the label to be a copied label if the number of grid coordinates having a coincident first code value does not fall within the predetermined value range; and a step of transmitting a result of the determination to the label reader. In this regard, the registration authentication code and the test authentication code are generated by the second invention mentioned above. That is to say, the registration authentication code is generated by finding a difference in brightness between grid coordinates corresponding to two mutually-different registration images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value. Furthermore, the test authentication code is generated by finding a difference in brightness between grid coordinates corresponding to two mutually-different test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value.

The label authentication server may be configured to further perform: a step of, with respect to the label identification code whose registration is confirmed, comparing the registration authentication code with the test authentication code, calculating the number of grid coordinates having a coincident second code value, determining the label to be a genuine label if the number of grid coordinates having a coincident second code value falls within a predetermined value range, and determining the label to be a copied label if the number of grid coordinates having a coincident second code value does not fall within the predetermined value range.

The label reader may be configured to calculate the number of grid coordinates having a first code value with respect to the test authentication code, determine the label to be a copied label if the number of grid coordinates having a first code value does not fall within a predetermined value range, and displays a result of the determination on the display unit.

The label reader may be configured to display, on the display unit, a guide window for guiding a user to take the test images. The guide window displayed on the display unit of the label reader may preferably be a guide window for limiting an edge of a label image taken with the second camera. When displaying the guide window, a rectangular guide window for guiding a user to take a label image with the camera kept parallel to the label may be displayed on the display unit. Alternatively, a trapezoidal guide window for guiding a user to take a label image with the camera kept tilted at a predetermined angle with respect to the label may be displayed on the display unit.

The system for authenticating a product authentication label according to the present invention may be configured such that the processing of the registration images and the test images is performed by the label authentication server rather than the label registration device and the label reader. The present system includes: a label registration device including a first camera and an image processing module for generating a registration authentication code by processing a plurality of mutually-different registration images of the label taken with the first camera; a label reader including a second camera, an image processing module for processing a plurality of mutually-different test images of an arbitrary label taken with the second camera, and a display unit for displaying a label authentication result; and a label authentication server. The label authentication server is configured to perform: a step of receiving a label identification code and a registration authentication code of the label from the label registration device and storing the label identification code and the registration authentication code in a database; a step of receiving a label identification code of an arbitrary label and a plurality of mutually-different test images from the label reader and receiving a label authentication request from the label reader; a step of confirming whether the label identification code received from the label reader is the label identification code registered in the database; a step of, with respect to the label identification code whose registration is confirmed, generating a test authentication code by processing the test images; a step of comparing the registration authentication code with the test authentication code, calculating the number of grid coordinates having a coincident first code value, determining the label to be a genuine label if the number of grid coordinates having a coincident first code value falls within a predetermined value range, and determining the label to be a copied label if the number of grid coordinates having a coincident first code value does not fall within the predetermined value range; and a step of transmitting a result of the determination to the label reader.

Fifth Invention

Portable Terminal for Authenticating a Product Authentication Label

According to another aspect of the present invention, there is provided a portable terminal for authenticating a product authentication label. The portable terminal may be a cellular phone such as a smart phone or the like, or a wireless Internet connection device such as an ipad or the like. If the product authentication label according to the present invention is authenticated by the portable terminal, it is possible for an ordinary consumer to personally determine the authenticity of a product at a product purchasing spot. This makes it possible to enhance the trading reliability and to perform the authentication regardless of locations. Moreover, it is not necessary to use a dedicated device for the authentication of a label. This makes it possible to reduce the authentication cost.

In the present invention, the label includes a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code. The present portable terminal includes a control unit, a display unit, a camera, and a memory device which stores a label-authenticating application program to be executed in the control unit. The label-authenticating application program includes: a step of displaying, on the display unit, a guide window for limiting a label image displayed on the display unit, in order for a user to limit the relative position of the label and the camera when imaging the label with the camera. The present portable terminal is configured to display an image-taking guide window on the display unit so that a user can take the test images at the same camera arrangement position as that used in taking the registration images. This makes it possible to enhance the reliability of label authentication.

In one preferred embodiment, the present portable terminal can transmit the taken images to the authentication server and to display an authentication result received from the authentication server on the display unit. In this case, the label-authenticating application program may include: a step of extracting the label identification code from label images guided into the guide window of the display unit and taken by the camera; a step of transmitting the extracted label identification code and the taken label images to a label authentication server connected to the Internet; and a step of receiving a label authentication result from the label authentication server and displaying the label authentication result on the display unit. The present portable terminal may display a plurality of guide windows so as to enable a user to take a plurality of mutually-different label images. In this case, a label identification code is extracted by selecting one of the label images.

In one preferred embodiment, the label-authenticating application program may further include: a step of displaying, on the display unit, a trapezoidal window the guide window for guiding a user to take the label images with the camera tilted at a predetermined angle with respect to the label, turning on a light of the portable terminal, and adjusting a focal point of the camera, so as to obtain the label images suitable for the imaging processing.

In another preferred embodiment, the present portable terminal may independently determine copying or non-copying of the label without having to request the label authentication server to perform label authentication. In this case, the label-authenticating application program may further include: a step of normalizing a plurality of mutually-different label images guided into the guide window of the display unit and taken by the camera; a step of extracting the label identification code and the test images from the normalized label images; a step of finding a difference in brightness between grid coordinates corresponding to the extracted test images and calculating the number of grid coordinates whose difference in brightness falls within a predetermined value range; a step of determining the label to be a copied label if the number of grid coordinates whose difference in brightness falls within the predetermined value range does not fall within a predetermined value range; and a step of displaying a result of the determination on the display unit.

The present portable terminal according to the present invention may normalize the test images taken with the camera, generate a test authentication code, transmit the test authentication code to the label authentication server and receive an authentication result from the label authentication server. In this case, the label-authenticating application program may further include: a step of normalizing a plurality of mutually-different images guided into the guide window of the display unit and taken by the camera; a step of extracting a label identification code and test images from the normalized images; a step of generating a test authentication code for the test images of the label by finding a difference in brightness between grid coordinates corresponding to the extracted test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value; a step of transmitting the label identification code and the test authentication code to a label authentication server connected to the Internet; and a step of receiving a label authentication result from the label authentication server and displaying the label authentication result on the display unit.

The guide window displayed on the display unit of the portable terminal may preferably be a guide window for limiting an edge of a label image taken with the second camera. When displaying the guide window, a rectangular guide window for guiding a user to take a label image with the camera kept parallel to the label may be displayed on the display unit. Alternatively, a trapezoidal guide window for guiding a user to take a label image with the camera kept tilted at a predetermined angle with respect to the label may be displayed on the display unit. The step of displaying the guide window on the display unit may include a step of displaying a rectangular guide window on the display unit and a step of displaying a trapezoidal guide window on the display unit.

The memory device of the portable terminal according to the present invention stores a plurality of guide window data which defines an arrangement state of the camera with respect to the label in order to obtain a plurality of mutually-different test images of the label. The step of displaying the guide window on the display unit may include a step of randomly selecting one of the guide window data displaying the selected guide window data on the display unit.

Sixth Invention

Computer-Readable Recording Medium which Stores a Program for Executing a Method for Authenticating a Product Authentication Label According to another aspect of the present invention, there is provided a computer-readable recording medium which stores a program for executing a method for authenticating a product authentication label.

In the present invention, the product authentication label includes a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code. The first and second reflection pattern forming bodies may be identical with or similar to those described in respect of the first invention and, therefore, will not be described in detail.

The method for authenticating a product authentication label, which is executed by the program stored in the recording medium according to the present invention, includes: a step of displaying, on a display unit, a guide window for limiting a label image displayed on the display unit, in order for a user to limit the relative position of the label and a camera when imaging the label with the camera; a step of normalizing a plurality of mutually-different images guided into the guide window of the display unit and taken by the camera; a step of extracting a label identification code and test images from the normalized images; a step of generating a test authentication code for the test images of the label by finding a difference in brightness between grid coordinates corresponding to the extracted test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value; a step of transmitting the label identification code and the test authentication code to a label authentication server connected to the Internet; and a step of receiving a label authentication result from the label authentication server and displaying the label authentication result on the display unit.

Advantageous Effects

In one embodiment, the product authentication label according to the present invention includes both the first reflection particles and the second reflection particles. This makes it difficult to copy the product authentication label and makes it possible to generate a reliable label authentication code capable of determining copying or non-copying of a label even if the imaging conditions are changed a little bit. Accordingly, it is possible to provide a low-priced trustworthy product authentication label.

In the method for generating an authentication code of a product authentication label according to the present invention, the number and mixing ratio of the first reflection particles and the second reflection particles are appropriately adjusted. Thus, even if the imaging conditions of the reflection pattern images for the production of an authentication code is changed to some extent, it is possible to adjust the variation of the authentication code generated from the same label. Accordingly, the label including the reflection particles each having a plurality of reflection surfaces can be used for product authentication.

With the method for authenticating a product authentication label according to the present invention, the authenticity of the label copied by printing and not containing any reflection particle can be easily determined by comparing two different images taken by a camera. Moreover, the authenticity of the label containing reflection particles can be reliably and easily determined by comparing the grid coordinates of the equal reflection regions of two mutually-different registration images with the grid coordinates of the equal reflection regions of two mutually-different test images.

With the system for authenticating a product authentication label according to the present invention, the authenticity of a label can be rapidly and reliably determined by comparing the label authentication code stored in the authentication server connected to the Internet with the test authentication code received from the label reader.

With the portable terminal for authenticating a product authentication label according to the present invention, it is possible for an ordinary consumer to personally determine the authenticity of a product at a product purchasing spot. This makes it possible to enhance the trading reliability and to perform the authentication regardless of locations. Moreover, it is not necessary to use a dedicated device for the authentication of a label. This makes it possible to reduce the authentication cost.

MODE FOR CARRYING OUT THE INVENTION

First Invention

Label for Determining Copying or Non-Copying of a Product

Figure 1A:
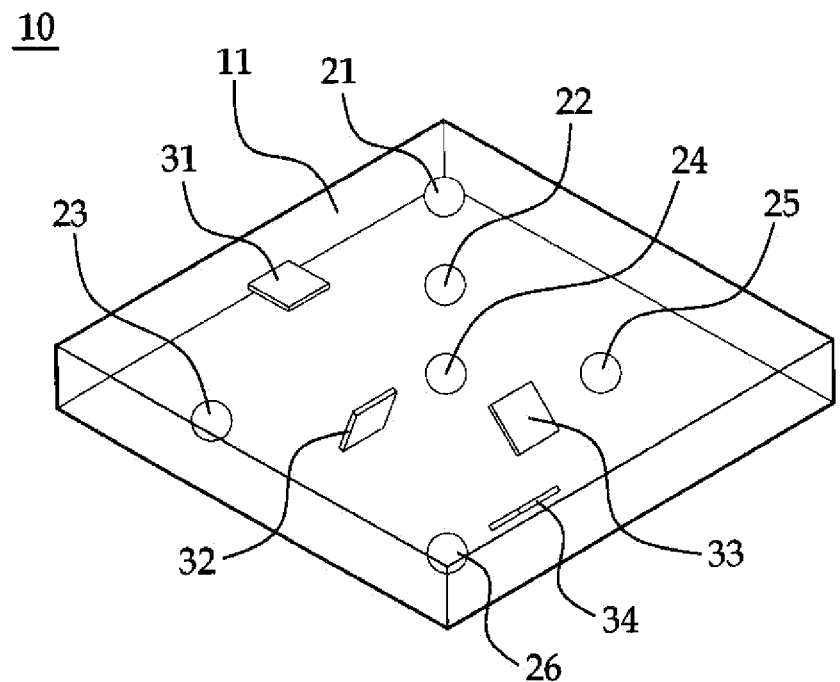
FIGS. 1A and 1B are schematic diagrams showing one embodiment of a product authentication label according to the present invention.
Figure 1B:
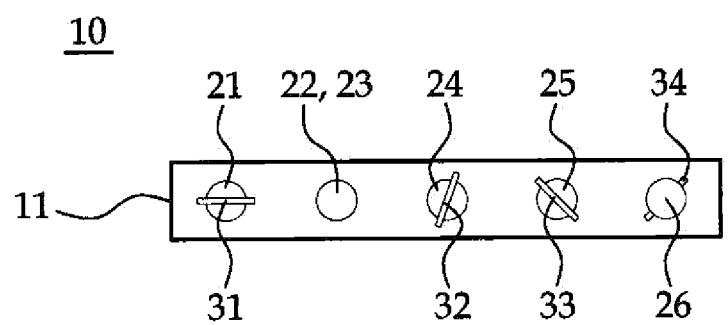

FIGS. 1A and 1B are schematic diagrams showing one embodiment of a product authentication label according to the present invention. FIG. 1A is a perspective view of a label 10. FIG. 1B is a schematic side view of the label 10.

The label 10 of the present embodiment includes a carrier layer 11 and a plurality of first reflection particles 21 to 26 and second reflection particles 31 to 34 distributed at random in the carrier layer 11. The carrier layer 11 is preferably made of, but is not limited to, a transparent or translucent synthetic resin. The synthetic resin is solidified so as to prevent the reflection particles from moving relative to one another. The carrier layer 11 is preferably made of, but is not limited to, a thermosetting resin or a UV-curable synthetic resin.

The label 10 is formed into a thin plate shape by putting the first reflection particles 21 to 26 and the second reflection particles 31 to 34 into a liquid synthetic resin, mixing the first reflection particles 21 to 26 and the second reflection particles 31 to 34 with the liquid synthetic resin such that the first reflection particles 21 to 26 and the second reflection particles 31 to 34 are uniformly distributed in the liquid synthetic resin, and subjecting the mixture to an extruding process, an injection molding process or a film-forming process. Alternatively, the label 10 may be formed by directly printing a liquid synthetic resin mixed with reflection particles on the surface of a product to be protected from copying. The label 10 may be printed on a protective film. Then, the protective film may be cut and affixed to a product. Examples of the method for printing the label include, but are not limited to, stamping, gravure printing and screen printing. The method for manufacturing the label 10 may be any method that can allow the first reflection particles 21 to 26 and the second reflection particles 31 to 34 to be distributed at random in the transparent carrier layer 11. For example, a liquid synthetic resin mixed with reflection particles may be sprayed on the surface of a product to directly form a coating layer. A liquid synthetic resin mixed with reflection particles may be sprayed on a protective film to form a coating layer. Then, the protective film may be cut and affixed to a product. In case where the label 10 is manufactured by a spraying method, it is preferred that a protective layer for protecting the label 10 is coated on the label 10. Moreover, the label 10 may be manufactured by uniformly spraying the first reflection particles and the second reflection particles on an uncured synthetic resin layer and then curing the synthetic resin layer. The thickness of the carrier layer 11 of the label 10 is set to fall within a range of 50 to 200 μm, preferably within a range of 100 to 150 μm. The size of the label 10 is preferably set such that the longitudinal dimension falls within a range of 10 to 30 mm and the transverse dimension falls within a range of 10 to 30 mm. However, the size of the label 10 is not limited thereto.

The first reflection particles 21 to 26 have smooth surfaces so that the first reflection particles 21 to 26 can reflect the light irradiated in all directions. The first reflection particles 21 to 26 may preferably be, but is not limited to, spherical glass beads coated with silver. The first reflection particles 21 to 26 may be manufactured by coating the surface of a spherical synthetic resin with gold, silver or other reflective metals. Beads made of a metal or a synthetic resin may be used in place of the glass beads. The first reflection particles 21 to 26 may be any particles provided with differentiable smooth surfaces with no angled portion and shaped to reflect the light irradiated on the label 10 in all directions. For example, spheroids such as an ovoid or the like can be used as the first reflection particles 21 to 26. The diameter of the first reflection particles 21 to 26 is preferably set to fall within a range of about 50 to 150 μm, preferably within a range of 100 to 300 μm and more preferably within a range of 150 to 500 μm. However, the present invention is not limited thereto.

The second reflection particles 31 to 34 have a plurality of reflective surfaces capable of reflecting only the light irradiated in a specific direction. The second reflection particles 31 to 34 may be aluminum flakes or sheets obtained by pulverizing glass, mica or thin synthetic resin plates. However, the second reflection particles 31 to 34 are not limited thereto. The second reflection particles 31 to 34 may be any granules having a plurality of reflective surfaces. For example, dice-shaped hexahedrons obtained by cutting a rectangular rod may be used as the second reflection particles 31 to 34. The major axis length of the second reflection particles 31 to 34 is preferably shorter than that of the first reflection particles 21 to 26. However, the present invention is not limited thereto. The major axis length of the second reflection particles 31 to 34 may be appropriately set in view of the thickness of the label 10. The major axis length of the second reflection particles 31 to 34 is preferably set to fall within a range of 50 to 100 μm or within a range of 100 to 300 μm. In order to increase the reflectivity of the second reflection particles 31 to 34, the surfaces of the second reflection particles 31 to 34 may be coated with gold, silver or other metals having high reflectivity.

In the present embodiment, first reflection pattern forming bodies are the first reflection particles and second reflection pattern forming bodies are the second reflection particles. In the meantime, equal reflection particles are defined as reflection particles which are included in both of two mutually-different images obtained by imaging a label with the difference in brightness between the reflection particles of the two images falling within a predetermined range. Biased reflection particles are defined as reflection particles which are included in only one of two mutually-different images, or reflection particles which are included in both of two mutually-different images with the difference in brightness between the reflection particles of the two images being equal to or greater than a predetermined value.

The first reflection particles have a property of reflecting a substantially constant amount of light in all directions regardless of the irradiation angle of light and the imaging position of a camera. Accordingly, the particle images taken in different directions are substantially similar in size and brightness to each other. In the label according to the present invention, most of the first reflection particles serve as equal reflection particles in terms of the label reflection property. On the other hand, the second reflection particles have a feature that the amount of light reflected by the second reflection particles is severely changed depending the irradiation angle of light and the imaging position of a camera. Thus, the second reflection particles are included or not included in a plurality of images taken by changing the imaging direction or the imaging angle. Even if the second reflection particles are included in a plurality of images, the amount of light reflected by the second reflection particles is severely changed depending the positions and postures of the second reflection particles. As a result, the brightness and size of the particle images are severely changed on an image-by-image basis. In the label according to the present invention, most of the second reflection particles serve as biased reflection particles in terms of the label reflection property.

In the present embodiment, for the sake of convenience in description, there are shown six first reflection particles 21 to 26 and four second reflection particles 31 to 34. However, the present invention is not limited thereto. In the manufacture of the label, it is preferred that the total number of the reflection particles is set equal to 100 to 150 and the mixture ratio of the first reflection particles and the second reflection particles is set to fall within a range of from 1:1 to 1:3. However, the present invention is not limited thereto.

Figure 2A:
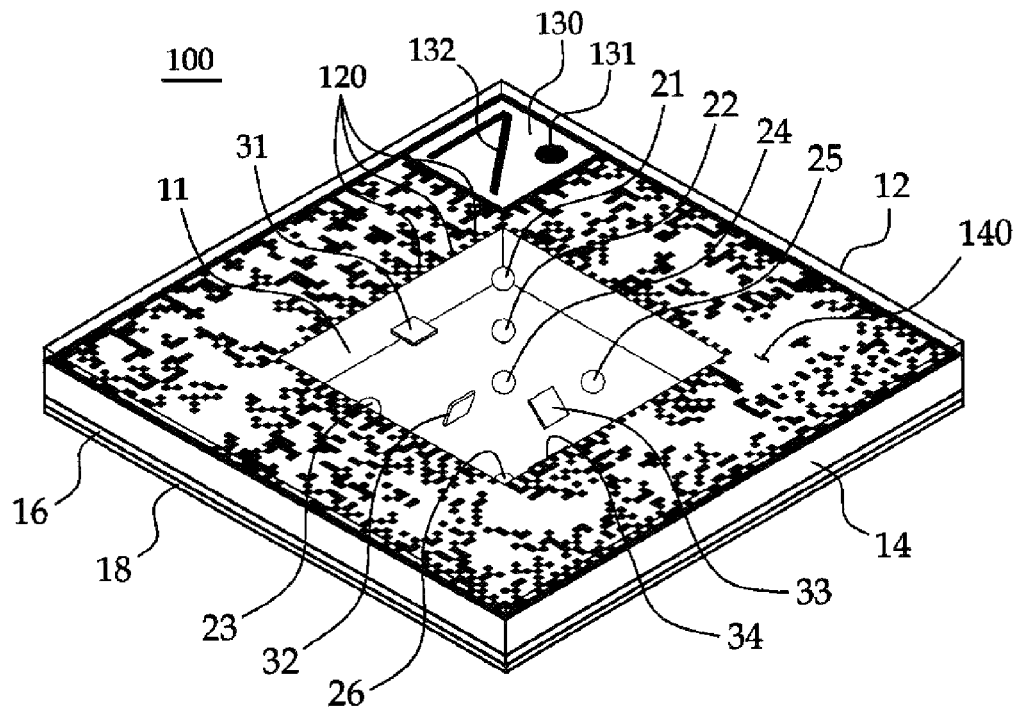
FIGS. 2A and 2B are schematic diagrams showing another embodiment of a product authentication label according to the present invention.
Figure 2B:
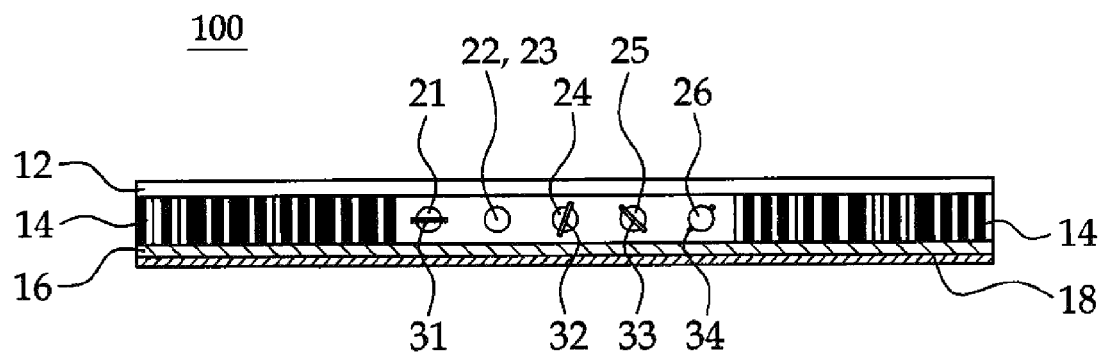
Figure 3B:
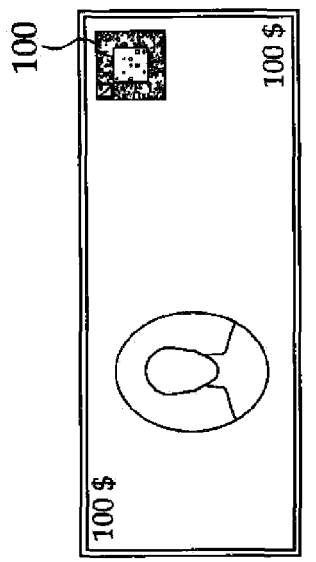
FIGS. 3A to 3I are explanatory views showing different kinds of products to which a label according to the present invention can be affixed.
Figure 3A:
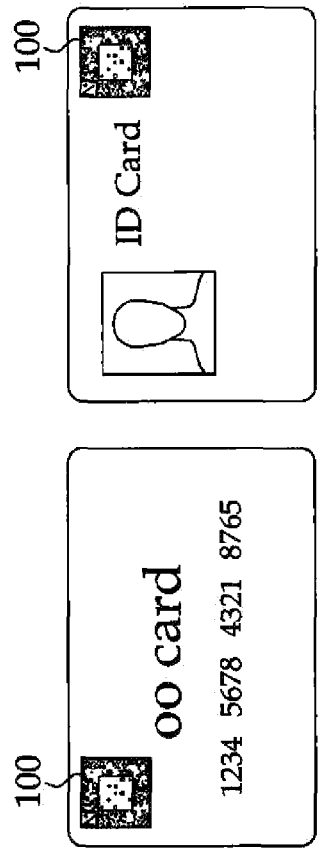
Figure 3C:
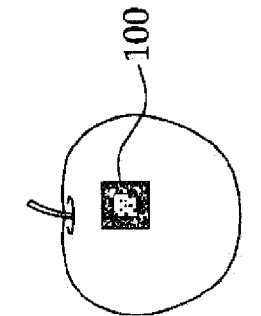
Figure 3E:
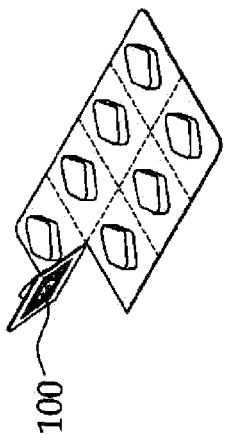
Figure 3D:
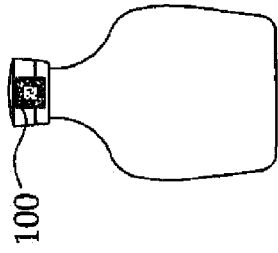
Figure 3F:
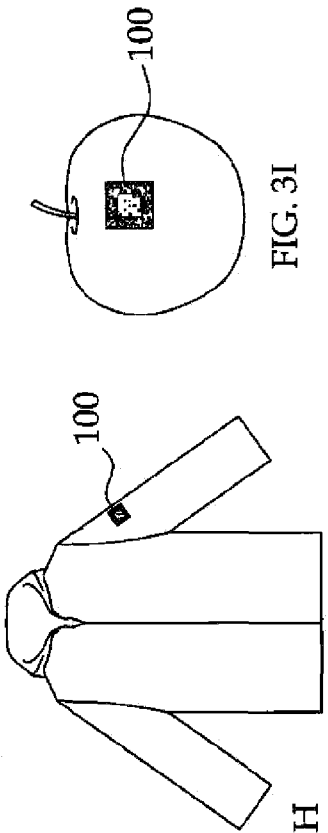
Figure 3H:
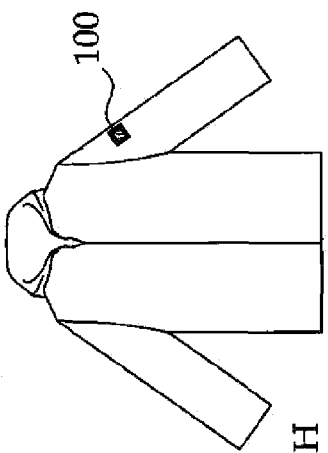
Figure 3G:
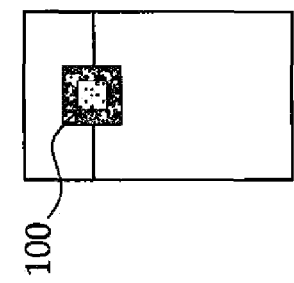
Figure 3I:
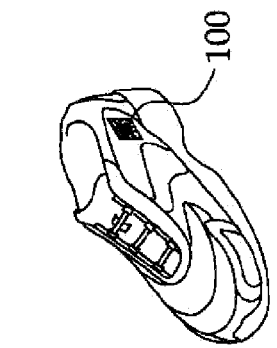
Figure 4A:
FIGS. 4A to 4G are explanatory views showing a process for manufacturing the product authentication label shown in FIGS. 2A and 2B.
Figure 4B:
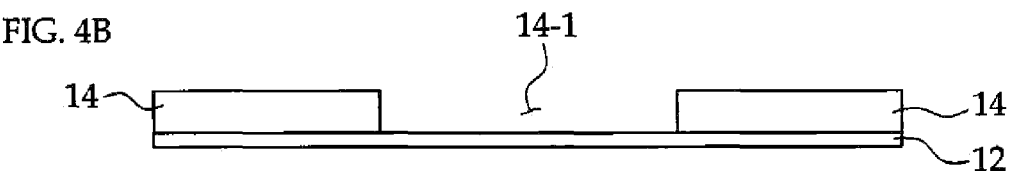
Figure 4C:
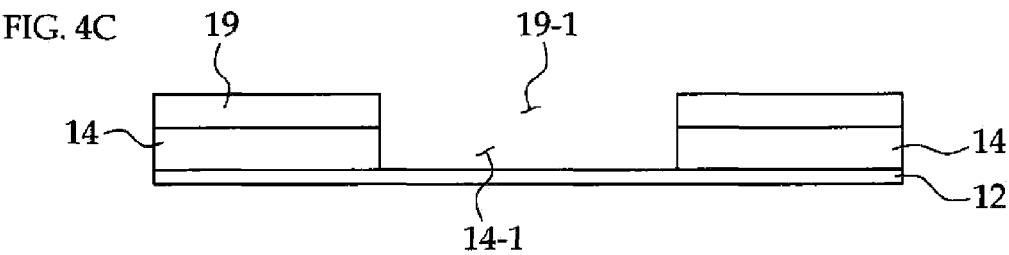
Figure 4D:
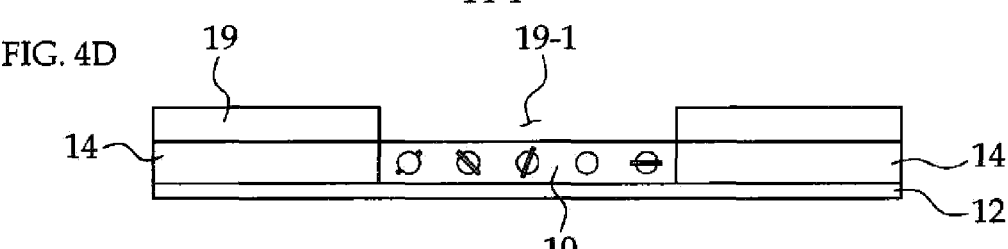
Figure 4E:
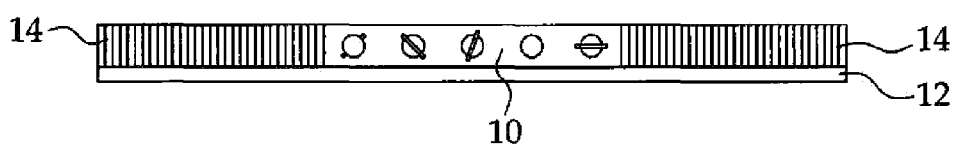
Figure 4F:
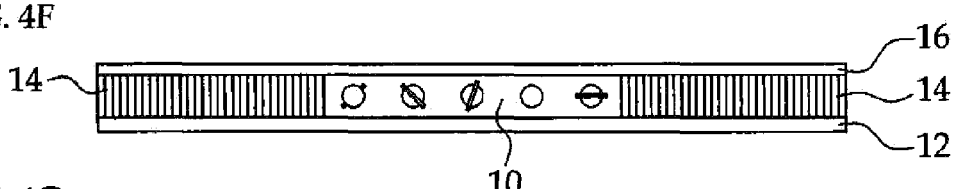
Figure 4G:
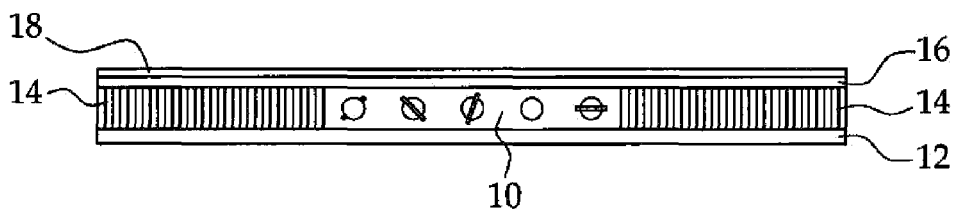

FIGS. 2A and 2B are schematic diagrams showing another embodiment of a product authentication label according to the present invention. FIG. 2A is a perspective view of a label 100 and FIG. 2B is a schematic sectional view taken along a boundary of a carrier layer 11 of a label 100.

The label 100 of the present embodiment includes a transparent synthetic resin film 12, a transparent or opaque carrier layer 11 laminated on the upper surface of the transparent synthetic resin film 12, a plurality of first reflection particles 21 to 26 and second reflection particles 31 to 34 distributed at random in the carrier layer 11. Furthermore, a label identification code layer 14 is laminated on the upper surface of the film 12 and is disposed so as to surround the carrier layer 11. In the label identification code layer 14, there is formed a pattern which codes the information on a product to which the label 100 is affixed, namely the information such as a product manufacturer, a serial number and the like.

Referring to FIG. 2, when seen at the front side at which a camera takes an image, the label identification code layer 14 includes a reference region 130 which indicates a reference point of a taken image, an identification code region 140 which indicates identification information including information on a product and information on a manufacturer, and a plurality of division reference points 120 which indicates reference points of division lines for dividing the carrier layer 11 into a virtual grid shape. A unique pattern 131 for indicating an origin of an image taken by a camera and a trademark 132 of the label 100 are indicated in the reference region 130. The identification code region 140 surrounds an edge of the carrier layer 11. A label identification code is formed as a two-dimensional pattern in the identification code region 140. Information such as a name of a product to which the label is affixed, a serial number, a manufacturer name, a manufacturer homepage address, an Internet address of an authentication server and the like is coded and included in the label identification code. The division reference points 120 are formed at a specified interval along the periphery of the carrier layer 11. The division reference points 120 are formed so as to surround four sides of the carrier layer 11. Alternatively, the division reference points 120 may be disposed only in two sides orthogonal to each other. The division reference points 120 are used to convert a taken image to a planar image in case where the label 100 is affixed to a product in a bent state or in case where the label 100 is imaged in an oblique direction.

A pattern is formed in the label identification code layer 14 through a printing process. Alternatively, a label identification code may be patterned by applying an ink on the film 12 and removing a portion of the ink with a laser marking device. The label identification code can be printed by different printing methods such as stamping, gravure printing and the like. A pattern of the label identification code may be directly printed on the film 12 by an inkjet printer. Laser marking and inkjet printing are advantageous in that a pattern can be formed while changing the information, such as a serial number and a manufacture date, which is included in the pattern of the label identification code for indicating product information and which needs to be changed when the label is affixed.

A protection layer 16 is formed on the carrier layer 11 and the label identification code layer 14. The protection layer 16 is formed by bonding a thin synthetic resin film or by coating a liquid synthetic resin. It is preferred that the protection layer 16 has a material and a color that absorb light without reflecting the same. An adhesive agent layer 18 for use in affixing the label 100 to a product is formed on the protection layer 16. It is preferred that the adhesive agent layer 18 has a bonding force large enough to break the label 100 when removing the label 100 affixed to a product.

FIGS. 3A to 3I show different kinds of products to which the product authentication label 100 according to the present invention can be affixed. The product authentication label according to the present invention is extremely hard to copy. It is therefore advisable to affix the product authentication label to a credit card (see FIG. 3A), an identification card such as a passport or the like (see FIG. 3B) or a banknote (see FIG. 3C) which has to be prevented from copying. The product authentication label according to the present invention is inexpensive and can be manufactured such that the label is broken upon unpacking a product. Thus, the product authentication label may be affixed to a mass-produced consumer product such as a cigarette (see FIG. 3D), a liquor bottle (see FIG. 3E), a drug capsule (see FIG. 3F) or the like. Moreover, the product authentication label may be used to certify an origin by affixing the label to an industrial product such as shoes (FIG. 3G), apparel (FIG. 3H) or the like, or an agricultural product such as an apple (see FIG. 3I) or the like. While not shown in the drawings, the product authentication label may be used to authenticate a product such as a component of a motor vehicle or an airplane or the like whose quality assurance is closely related to safety. The product authentication label may be used to authenticate, a high-priced product such as a watch, a jewel or the like. The product authentication label according to the present invention has a unique authentication code on, a label-by-label basis. Thus, the product authentication label can be used as a door key or can be used as a copy-preventing key of a computer program or a key for gaining access to a coded electronic document.

FIGS. 4A to 4G show a process for manufacturing the product authentication label 100 shown in FIGS. 2A and 2B. First, a transparent synthetic resin film 12 is prepared (see FIG. 4A). A film hardly reflecting light when imaged by a camera is suitably used as the film 12. Next, a label identification code layer 14 is formed on the upper surface of the film 12 (see FIG. 4B). A pattern is not formed in the label identification code layer 14. The label identification code layer 14 can be formed by coating a color ink or by laminating a synthetic resin film, a silver foil film or a paper sheet which can be subjected to laser marking. A through-hole 14-1 into which a carrier layer 11 is inserted is formed in the label identification code layer 14. Next, a mask 19 is laminated on the label identification code layer 14 (see FIG. 4C). A through-hole 19-1 through which a liquid synthetic resin for the formation of the carrier layer 11 is injected is formed in the mask 19. Next, the label 10 shown in FIGS. 1A and 1B, which contains first reflection particles and second reflection particles, is inserted into the through-hole 14-1 (see FIG. 4D). Instead of the label 10 shown in FIGS. 1A and 1B, a liquid synthetic resin mixed with first reflection particles and second reflection particles may be injected into the through-hole 14-1. The injection may be performed by spraying a liquid synthetic resin into the through-hole 14-1. Next, the mask 19 is removed and a pattern of a label identification code is formed in the label identification code layer 14 by a laser (see FIG. 4E). Next, a protection layer 16 is formed by coating a synthetic resin layer (see FIG. 4F). Next, an adhesive agent layer 18 is formed on the protection layer 16 (see FIG. 4G). While not shown in the drawings, a releasable strip for protecting the adhesive agent layer 18 until the label 100 is affixed to a product may be attached to the adhesive agent layer 18.

Figure 26:
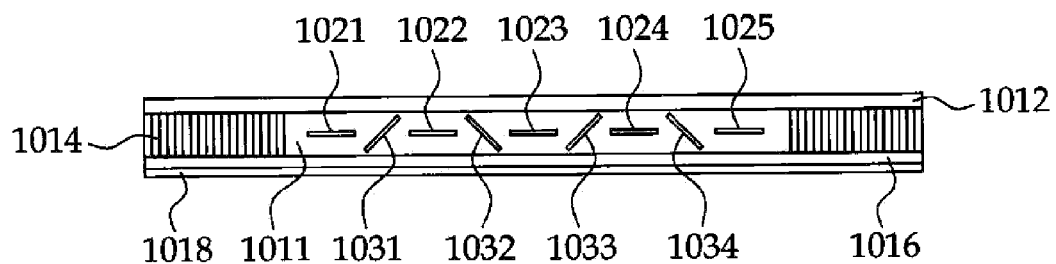
FIG. 26 is a sectional view showing another embodiment of a product authentication label according to the present invention.

FIG. 26 is a sectional view showing another embodiment of a product authentication label according to the present invention. The embodiment shown in FIG. 26 differs from the embodiment shown in FIGS. 2A and 2B in that the first reflection particles 1021, 1022, 2023, 1024 and 1025 have a disc shape rather than a spherical shape. The diameter of the disc-shaped first reflection particles is at least 1.5 to 2 times as large as the thickness of the carrier layer 1011. Furthermore, it is preferred that the thickness of the disc-shaped first reflection particles is a little smaller than the thickness of the carrier layer 1011. Therefore, when disposed within the carrier layer 1011, the first reflection particles are always laid down without being erected like the second reflection particles 1031, 1032, 1033 and 1034. Accordingly, the disc-shaped first reflection particles shown in FIG. 26 serve as a plurality of first reflection pattern forming bodies that reflects a substantially identical reflection pattern regardless of the direction of irradiated light. The second reflection panicles serve as second reflection pattern forming bodies just like the embodiment shown in FIGS. 1A and 1B.

Figure 27:
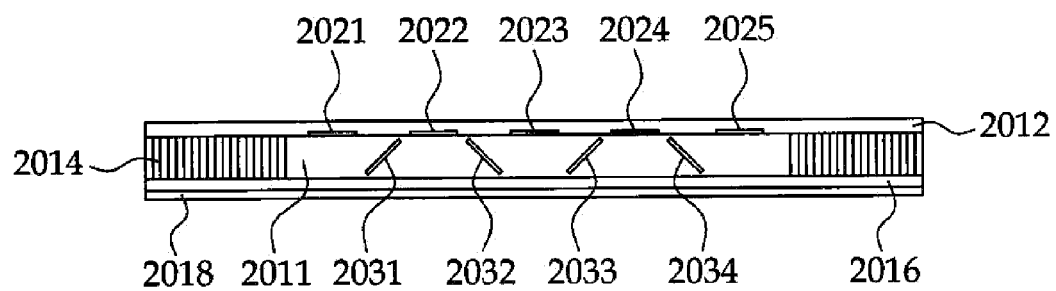
FIG. 27 is a sectional view showing a further embodiment of a product authentication label according to the present invention.

FIG. 27 is a sectional view showing a further embodiment of a product authentication label according to the present invention. In the label shown in FIG. 27, only second reflection particles 2031, 2032, 2033 and 2034 are randomly disposed within a carrier layer 2011. On the upper surface of the carrier layer 2011, ink layers 2021, 2022, 2023, 2024 and 2025 are coated in the form of dots having a thickness of 100 to 500 µm through a spraying process. The ink layers coated on the upper surface of the carrier layer 2011 have a property of reflecting a substantially identical reflection pattern regardless of the direction of irradiated light. Thus, the ink layers serve as first reflection pattern forming bodies. While the ink layers are formed through a spraying process, the present invention is not limited thereto. The ink layers may be formed printing the same with an inkjet printer or may be formed by a marbling technique. The second reflection particles serve as second reflection pattern forming bodies just like the embodiment shown in FIGS. 1A and 1B.

Figure 28:
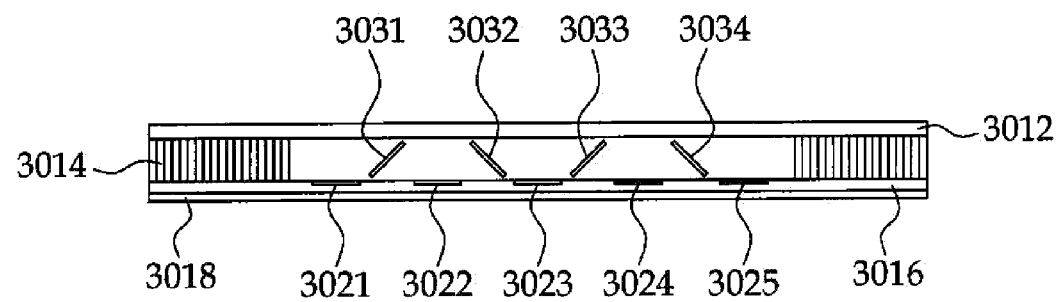
FIG. 28 is a sectional view showing a still further embodiment of a product authentication label according to the present invention.

FIG. 28 is a sectional view showing a still further embodiment of a product authentication label according to the present invention. The embodiment shown in FIG. 28 differs from the embodiment shown in FIG. 27 in that ink layers 3021, 3022, 3023, 3024 and 3025 are formed on the lower surface of a carrier layer 3011.

Second Invention

Method for Generating an Authentication Code of a Product Authentication Label According to the Present Invention An authentication code of a product authentication label is obtained by extracting and coding unique physical features capable of distinguishing a specific label from another label. Thus, the label authentication code needs to be unique. In order for a label having a unique authentication code to be used as a product authentication label, it is required that it is technically quite difficult to copy the label per se. A label containing randomly distributed reflection particles exhibits a unique reflection pattern on a label-by-label basis. Position information of reflection particles specific to each label is contained in the reflection pattern. By extracting the position information of reflection particles specific to each label from the label reflection pattern and coding the extracted position information, it is possible to use the position information as a label authentication code.

In case of the label composed of only the first reflection particles, the first reflection particles have smooth surfaces that reflect the light irradiated in all directions. Therefore, even if the imaging conditions of a camera are slightly changed, it is possible to obtain images having similar reflection patterns. Accordingly, the same authentication code can be extracted from the same label by different devices. This makes it possible to easily perform label authentication. On the other hand, it is possible to easily extract particle position information from a taken image. Thus, there is a drawback in that the label can be easily copied by printing a taken image or by disposing particles at right positions.

In case of the label composed of only the second reflection particles, the second reflection particles have a plurality of reflection surfaces. Therefore, the reflection pattern is largely changed depending on the change in the imaging conditions such as the imaging position of a camera and the intensity of light. Accordingly, the label composed of only the second reflection particles has an advantage in that it is quite difficult to manufacture a copied label which shows a reflection pattern similar to that of a genuine label under different imaging conditions. While the label composed of only the second reflection particles is hard to copy, it is technically quite difficult to obtain an identical or similar reflection pattern from the same label using a plurality of devices. This poses a problem in that it is impossible to assure the reliability of label authentication. In conclusion, the label composed of only the first reflection particles and the label composed of only the second reflection particles have critical drawbacks and cannot be uses as product authentication labels.

The product authentication label 100 according to the present invention includes a plurality of first reflection pattern forming bodies which reflects a substantially identical reflection pattern regardless of the direction of irradiated light and a plurality of second reflection pattern forming bodies which reflects a reflection pattern changed depending on the direction of irradiated light. In the embodiment shown in FIGS. 1A and 1B, the first reflection pattern forming bodies are first reflection particles which have smooth surfaces formed so as to reflect the light irradiated in all directions. The second reflection pattern forming bodies are second reflection particles which have a plurality of reflection surfaces formed so as to reflect the light irradiated in a specific direction. In generating the authentication code in the aforementioned manner, the label 100 according to the present invention includes particles having mutually different features, namely the first reflection particles and the second reflection particles. Thus, the label 100 is hard to copy and can generate an authentication code that can be distinguished by the reflection patterns generated by the reflection particles even if the imaging conditions are changed to some extent. This makes it possible to stably authenticate the label.

Next, a method for generating an authentication code of the label 100 using two mutually-different label reflection pattern images of the product authentication label 100 according to the present invention will be described with reference to FIGS. 5 to 9. The authentication code includes the position information of equal reflection particles and the position information of biased reflection particles appearing in two mutually-different images of the label 100. The equal reflection particles mean reflection particles which are, included in both of two mutually-different reflection pattern images of a label with the difference in brightness between the reflection particles of the two images falling within a predetermined range. The biased reflection particles mean reflection particles which are included in only one of two mutually-different reflection pattern images of a label with the brightness of the reflection particles being equal to or greater than a predetermined value, or reflection particles which are included in both of two mutually-different reflection pattern images of a label with the difference in brightness between the reflection particles of the two images being equal to or greater than a predetermined value.

Color and brightness information corresponding to the pixels of a camera is included in a digital image obtained by imaging a label. When imaged by a digital camera, most of the spherical first reflection particles are included in both of two mutually-different images of a label regardless the position of the camera due to the features of the first reflection particles. Furthermore, the change in the brightness of the first reflection particles in the two mutually-different images is relatively small due to the features of the first reflection particles. In contrast, the second reflection particles such as flakes or the like having a plurality of reflection surfaces are included in both of two mutually-different images of a label, or included in only one of the two images, or not included in any of the two images, depending on the position of a camera facing toward a label. In case where the second reflection particles are included in both of the two images, the change in the brightness of the second reflection particles in the two images is larger than that of the spherical first reflection particles. This is because the two images are taken at different camera positions and because the angles of the reflection surfaces of the second reflection particles facing toward the camera are changed depending on the change in the position of the camera (or the change in the position of a light source) with respect to the second reflection particles existing at specified positions of the label. Due to the aforementioned reflection properties of the reflection particles contained in the label, most of the equal reflection particles found by comparing two mutually-different images of the label are the first reflection particles. Most of the biased reflection particles are the second reflection particles. That is to say, depending on the imaging conditions, the position information of the second reflection particles may be included in the position information of the equal reflection particles. The position information of the first reflection particles may be included in the position information of the biased reflection particles.

Figure 5:
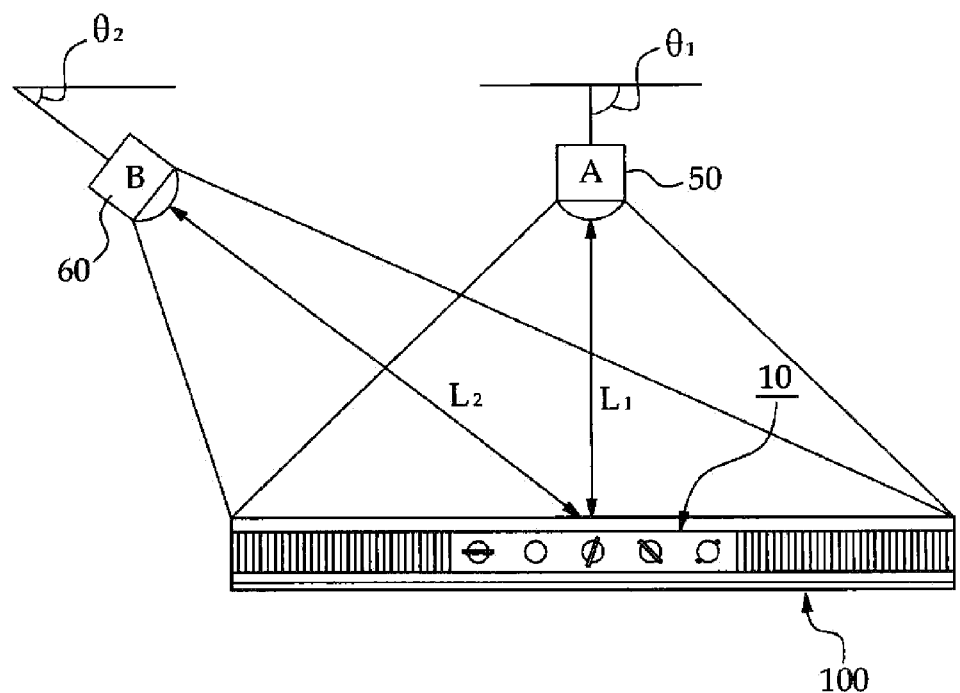
FIG. 5 is a schematic diagram showing the arrangement of cameras for taking registration images of the product authentication label shown in FIGS. 2A and 2B.

FIG. 5 shows two cameras 50 and 60 installed above the label 100 and configured to take two mutually-different label images. The camera A 50 is disposed parallel to the label 100 so as to take a reflection pattern image of the label 100 seen from just above the label 100. The camera B 60 is tilted with respect to the label 100 at a predetermined angle θ2 so as to take a reflection pattern image of the label 100 seen from one lateral side of the label 100. It is preferred that CCD cameras for obtaining digital images are used as the cameras 50 and 60. However, the present invention is not limited thereto. The two mutually-different label images may be obtained by imaging the label 100 at different positions while horizontally moving one camera 50. It may also be possible to use two mutually-different reflection pattern images of the label 100 which are taken by changing the position of a light source of one camera 50 installed at one fixed position. Moreover, two mutually-different reflection pattern images may be obtained by scanning the label 100 with an array-type optical sensor rather than a camera. At this time, two mutually-different label images may be obtained by performing the scanning in different directions. In case of performing the scanning in the same direction, two mutually-different label images may be obtained by changing the position of a light source.

Figure 6A:
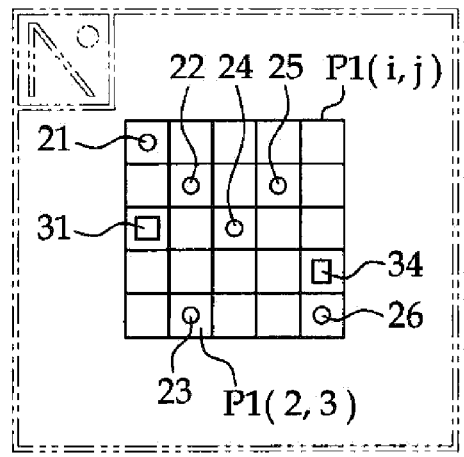
FIGS. 6A and 6B are schematic diagrams showing reflection particles appearing in the respective registration images taken with two cameras shown in FIG. 5.
Figure 6B:
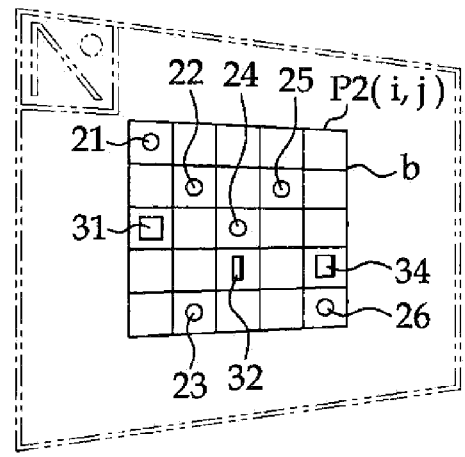

FIG. 6A shows a reflection pattern image of the label 100 taken by the camera A 50 and FIG. 6B shows a reflection pattern image of the label 100 taken by the camera B 60. In FIGS. 6A and 6B, the positions of the reflection particles included in the images are indicated in an easily understandable manner in order to describe a process for finding an authentication code using two mutually-different images. In reality, it is difficult to identify the shapes of the respective reflection particles by visually observing an image of the label 100 which contains reflection particles having a size of about 100 to 500 µm. For the sake of convenience in description, the shapes of the reflection particles are shown in a distinguishable manner. In the following description, two mutually-different images taken for the purpose of generating an authentication code will be referred to as registration images and will be indicated by P1(i,j) and P2(i,j) as shown in FIGS. 6A and 6B.

The registration image P1(i,j) shown in FIG. 6A has a square shape because the camera A 50 for taking the registration image P1(i,j) is disposed just above the label 100 in a parallel relationship with the label 100. The registration image P2(i,j) shown in FIG. 6B has a trapezoidal shape because the camera B 60 for taking the registration image P2(i,j) is tilted at a predetermined angle with respect to the label 100. Rectangular grids shown in each of the registration images virtually divide each of the registration images in order to indicate the positions of the images particles. Referring to FIGS. 2A and 2B, the taken image is divided on the basis of the division reference points 120 of the label identification code layer 14 surrounding the carrier layer 11. Each of the grids thus divided indicates grid coordinates of the taken image. In case of an image taken by a low-resolution camera, grids and pixels may be in a one-to-one correspondence relationship. In case of an image taken by a high-resolution camera, several camera pixels may be included in one grid. The number of pixels to be included in one grid can be adjusted depending, on the size of reflection particles and the resolution of a camera. For example, in case of taking an image of the label 100 which contains reflection particles having a size of about 100 µm, it is preferred that the image is divided such that the length of one side of a gird becomes equal to about 100 µm. After the size of a grid is decided, the number of camera pixels included in one grid is decided depending on the resolution of a camera.

Referring to FIGS. 6A and 6B, six first reflection particles 21 to 26 and two second reflection particles 31 and 34 are included in the registration image P1(i,j). Six first reflection particles 21 to 26 and three second reflection particles 31, 32 and 34 are included in the registration image P2(i,j). In the respective images, circular symbols indicate the positions of the first reflection particles in the label 100 and rectangular symbols indicate the positions of the second reflection particles in the label 100. In FIGS. 6A and 6B, for the sake of convenience in description, the positions of the particles are shown under the assumption that the arrangement of the first reflection particles 21 to 26 and the second reflection particles 31 to 34 contained in the label 100 is known. However, when the label 100 in which the particles are randomly disposed is imaged by the camera A 50 and the camera B 60, it is impossible to accurately identify which of the taken images is the image of the first reflection particles and which of the taken images is the image of the second reflection particles. In view of the features of the particles, it can be presumed that most of the particle images existing at the same position in two mutually-different registration images P1(i,j) and P2(i,j) taken by the camera A 50 and the camera B 60 are the images of the first reflection particles and further that most of the particle images appearing in only one of the registration images P1(i, j) and P2(i,j) are the images of the second reflection particles.

The registration image P1(i,j) is square and the registration image P2(i,j) is trapezoidal. Thus, the registration images P1(i,j) and P2(i,j) differ in shape from each other. The grid coordinates of the reflection particles cannot be found by directly comparing the two registration images P1(i,j) and P2(i,j). Furthermore, when taking the respective registration images, there may be a difference in the surrounding illumination. It is therefore impossible to directly compare the brightness values of the corresponding grid coordinates. For that reason, in order to compare two reflection pattern images having different sizes, there is a need to normalize the two mutually-different reflection pattern images. Moreover, the two mutually-different reflection pattern images should be normalized in order to correct the change in the brightness of the reflection pattern images of the label 100 attributable to the change in the illumination.

A method of normalizing an image is a technique well-known to those skilled in an image processing field. For example, there are known many different image processing techniques for resizing an image and filtering a noise in case where the taken image for a bent or deformed label is a slightly-distorted rectangular or trapezoidal image or an inverted or rotated image. In order to apply the aforementioned image processing techniques, a reference point for processing an image of the label 100 is needed. The label 100 of the present embodiment contains a symbol 131 which indicates an origin shown in the reference region 130 of the label identification code layer 14 and a symbol 132 which makes it possible to recognize the rotation and inversion of an image.

Figure 7A:
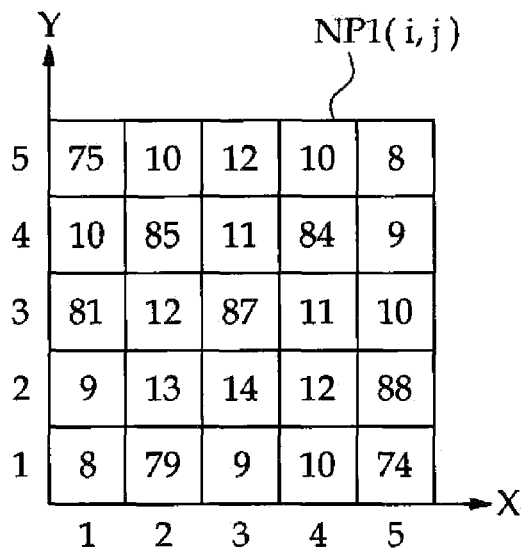
FIG. 7A and 7B are explanatory views showing the normalized state of the registration images shown in FIGS. 6A and 6B and the brightness numerically expressed in a grid coordinate.
Figure 7B:
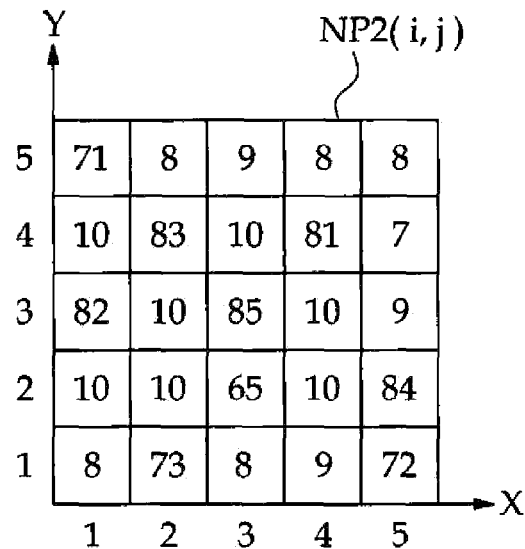

FIGS. 7A and 7B show the respective registration images which are normalized in order to compare the brightness values of the grid coordinates corresponding to the registration images P1(i,j) and P2(i,j). In the following description, the two mutually-different registration images normalized as shown in FIGS. 7A and 7B will be referred to as normalized registration images and will be indicated by NP1(i,j) and NP2(i,j). The respective grids of the normalized registration images indicate the coordinates. The numerals shown in the grid coordinates indicate the brightness of grid coordinate regions. The grid coordinates indicating the position of a divided image region may correspond to one pixel of a camera or may include a plurality of pixels. In case where one grid coordinates corresponds to one pixel of a camera, the brightness of the grid coordinates is equal to the brightness of the corresponding pixel. In case where a plurality of pixels is included in one grid coordinates, the brightness of the grid coordinates may be an average value of the brightness values of the respective pixels included in the grid or may be the total sum of the brightness values of the respective pixels. In the present embodiment, the normalized image is divided into a rectangular grid shape by horizontally and vertically dividing the normalized image at a specified interval. However, the present invention is not limited thereto. The grid coordinates may be given by finding the sizes and positions of the particles from the normalized image and dividing the normalized image into grids having a specified size about the position coordinates of the particles. The grid coordinates may be found by dividing the normalized image into circles having a specified radius about the positions of the particles. Moreover, the normalized image may be divided into rectangular grids having a specified length about the positions of the particles.

The position information of the first reflection particles and the second reflection particles shown in FIGS. 6 and 6B cannot be found by merely comparing the brightness values of the respective grid coordinates corresponding to the normalized registration image NP1(i,j) taken by the camera A 50 and the normalized registration image NP2(i,j) taken by the camera B 60. However, by comparing the changes in the brightness of the corresponding grid coordinates, it is possible to find the position information of most of the equal reflection particles and the biased reflection particles. In case where the spherical first reflection particles are included in both of the two mutually-different normalized registration images, the difference in brightness between the two normalized registration images is relatively small due to the features of the first reflection particles. In case where the flake-shaped second reflection particles are included in both of the two mutually-different normalized registration images, the difference in brightness between the two normalized registration images is larger than that of the spherical first reflection particles due to the features of the second reflection particles. Moreover, the brightness of the grid coordinates of the particles included in the respective normalized registration images is higher than the brightness of the grid coordinates of the particles not included in the respective normalized registration images.

The brightness values of the grid coordinates of the mutually-corresponding positions in the two mutually-different normalized registration images are compared with each other. If the difference in brightness falls within a predetermined range, the grid coordinates is classified into the grid coordinates at which the equal reflection particles are positioned. If the difference in brightness between the corresponding grid coordinates is larger than a predetermined value, the grid coordinates is classified into the grid coordinates at which the biased reflection particles are positioned. In the respective normalized registration images, the grid coordinates having the brightness equal to or smaller than the predetermined value is classified into the grid coordinates at which the particles do not exist. In the normalized registration images of the label 100, the respective grid coordinates indicates the divided regions of the normalized registration images. Thus, the grid coordinates at which the equal reflection particle exists may be classified into an equal reflection region. The grid coordinates at which the biased reflection particle exists may be classified into a biased reflection region. The grid coordinates at which the particle do not exist may be classified into a blank region. In case where the size of the grid coordinates is significantly larger than the size of the reflection particles, a plurality of reflection particles may be included in one grid coordinates. If the size of the grid coordinates is similar to the size of the reflection particles and if the thickness of the carrier layer is sufficiently small such that the reflection particles do not overlap with each other in the thickness direction, one reflection particle may be included in one grid coordinates. That is to say, the classification of certain grid coordinates into the equal reflection region or the biased reflection region is decided by the value of the difference in brightness between the corresponding grid coordinates of the two substantially normalized images taken under the mutually-different conditions. Depending on the size of the grid coordinates, one or more particles may be included in the grid coordinates classified into the equal reflection region. The particle included in the equal reflection region may include not only the first reflection particle but also the second reflection particle. Moreover, one or more particles may be included in the grid coordinates classified into the biased reflection region. The particle included in the biased reflection region may include not only the first reflection particle but also the second reflection particle.

A method for generating an authentication code by comparing the corresponding grid coordinates in the two normalized registration images NP1(i,j) and NP2(i,j) and finding the position information of the equal reflection region and the position information of the biased reflection region will be described in detail with reference to FIGS. 7 to 9.

First, a reference value for distinguishing the brightness of a grid not containing a particle and the brightness of a grid containing a particle in the normalized registration images of the label 100 is set by taking images of a plurality of labels several times. In the present embodiment, the reference value is set at 20. That is to say, if the brightness of a grid is equal to or larger than 20, the grid coordinates is determined to be the grid coordinates at which the reflection particles exist. If the brightness of a grid is smaller than 20, the grid coordinates is determined to be the blank grid coordinates. Furthermore, a reference range of brightness difference for classifying the grid coordinates containing a particle into the equal reflection region is set by repeating a test in which images of a plurality of labels are taken several times. In the present embodiment, the reference range of brightness difference for classifying the grid coordinates into the equal reflection region is set at a range of 0 to 15.

That is to say, if the brightness difference BD between the corresponding grid coordinates falls within a range of 0 to 15 (if $0 \leq BD \leq 15$), the grid coordinates is classified into the equal reflection region. Moreover, a reference range of brightness difference for classifying the grid coordinates containing a particle into the biased reflection region is set by virtue of tests. In the present embodiment, the range of the brightness difference exceeding 15 is set as the reference range. That is to say, if the brightness difference (BD) between the corresponding grid coordinates exceeds 15 (if $BD>15$), the grid coordinates is classified into the biased reflection region. Alternatively, if the brightness difference between the grid coordinates corresponding to a plurality of finely-normalized images falls within a predetermined range and if the brightness is equal to or higher than a threshold value, the relevant grid coordinates may be classified into the biased reflection region.

An authentication code is generated by finding a brightness difference between the corresponding grid coordinates of two normalized registration images taken under different conditions and giving a code value corresponding to the brightness difference to the respective grid coordinates. In the present embodiment, code value 1 is given to the grid coordinates classified into the equal reflection region. Code value −1 is given to the grid coordinates classified into the biased reflection region. Code value 0 is given to the grid coordinates classified into the blank region.

A process for generating an authentication code of the label 100 by comparing the brightness values of the corresponding grid coordinates of two normalized registration images taken under different conditions as shown in FIGS. 7A and 7B will be described with reference to FIG. 9.

First, two mutually-different images of the product authentication label 100 for which an authentication code is to be registered are taken under different imaging conditions (S100). Next, the two registration images are normalized to find the normalized registration images NP1(i,j) and NP2(i,j) shown in FIGS. 7A and 7B (S110). Next, a difference in brightness (BD=|NP1(i,j)−NP2(i,j)|) between the corresponding grid coordinates of the two normalized registration images NP1(i,j) and NP2(i,j) is found (S120). Determination is made as to whether the brightness of the corresponding grid coordinates of the two normalized registration images is smaller than a predetermined value (K1) (S130). If the brightness of the grid coordinates of the two normalized registration images is smaller than the predetermined value, the grid coordinates is regarded as the grid coordinates at which the reflection particle does not exist, namely as the blank region, and code value 0 is given to the grid coordinates (S190). Referring to FIGS. 7A and 7B, the brightness of the grid NP1(1,1) is 8 which is smaller than 20 and the brightness of the grid NP2 (1,1) is 8 which is smaller than 20. Thus, the code value PA (1,1) given to the grid coordinates PA (1,1) of the authentication code is 0. The brightness of the grid NP1(1,2) is 9 which is smaller than 20 and the brightness of the grid NP2(1,2) is 10 which is smaller than 20. Thus, the code value PA (1,2) given to the grid coordinates PA (1,2) of the authentication code is 0.

As for the grid coordinates which is not the blank region, if the difference in brightness between the corresponding grid coordinates falls within a predetermined region (if K2≤BD≤K3)(S140), the grid coordinates is classified into the equal reflection region and is given code value 1 (S150). As for the grid coordinates which is not the blank region, if the difference in brightness between the corresponding grid coordinates exceeds a predetermined value K3 (S170), the grid coordinates is classified into the biased reflection region and is given code value −1 (S180). Referring to FIGS. 7A and 7B, the brightness of the grid NP1(1,3) is 81 and the brightness of the grid NP2(1,3) is 82. The brightness difference (|81−82|) is 1. Thus, the grid coordinates PA(1,3) of the authentication code is classified into the equal reflection region and the code value PA(1,3) given to the grid coordinates PA(1,3) of the authentication code is 1. Moreover, the brightness of the grid NP1(3,2) is 14 and the brightness of the grid NP2(3,2) is 65. The brightness difference (|14−65|) is 51. Thus, the grid coordinates PA(3,2) of the authentication code is classified into the biased reflection region and the code value PA(3,2) given to the grid coordinates PA(3,2) of the authentication code is −1.

Figure 8:
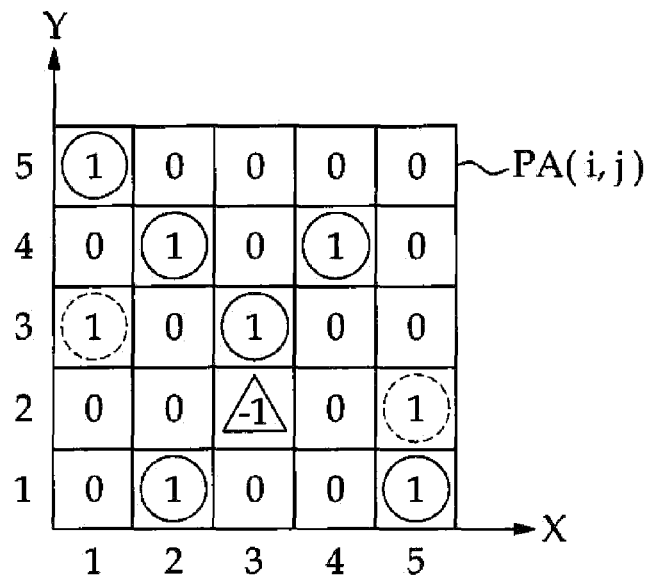
FIG. 8 is an explanatory view of an authentication code obtained by comparing two normalized registration images shown in FIGS. 7A and 7B.
Figure 9:
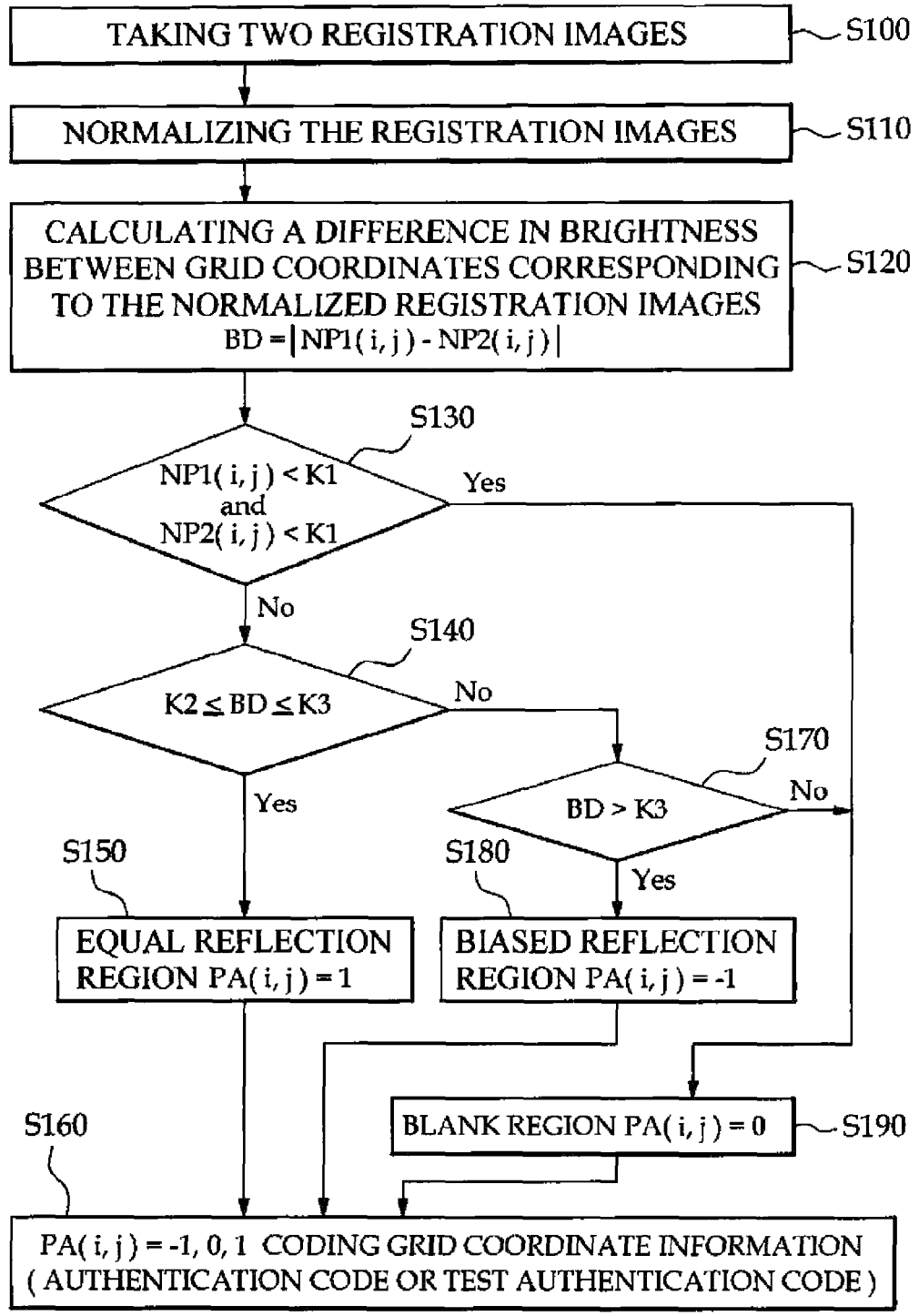
FIG. 9 is a flowchart illustrating a method for generating an authentication code of a product authentication label according to the present invention.

An authentication code PA(i,j) shown in FIG. 8 is generated by finding the brightness differences of all the grid coordinates and giving the code values to the grid coordinates (S160). FIG. 8 shows an authentication code PA(i,j) of the label 100 which is obtained by finding the brightness differences of all the corresponding grid coordinates of the two normalized registration images shown in FIGS. 7A and 7B and giving the code values to the grid coordinates. The grid coordinates classified into the equal reflection region are PA(1, 3), PA(1, 5), PA(2,1), PA(2, 4), PA(3, 3), PA(4, 4), PA(5, 1) and PA(5, 2) (indicated by 1 within a circle). The grid coordinates classified into the biased reflection region is PA(3,2) (indicated by −1 within a triangle). The remaining grid coordinates are the blank regions and have a value 0. For reference, the authentication code PA(i,j) of the label 100 shown in FIG. 8 has the code values indicated in the rectangular grid coordinates. Alternatively, the authentication code may be expressed by many different methods such as the polar coordinates or the relative distance between the reflection particles.

If the number and position information of the first reflection particles 21 to 26 and the number, position information and posture information of the second reflection particles 31 to 34 are accurately known as shown in FIGS. 1A and 1B, it would be possible to know that the reflection particles positioned at the grid coordinates PA(1,3) and PA(5,2) indicated by dot line circles in FIG. 8 are the second reflection particles 31 and 34 and the reflection particles positioned at the grid coordinates PA(1,5), PA(2,1), PA(2,4), PA(3,3), PA(4,4) and PA(5,1) indicated by solid line circles in FIG. 8 are the first reflection particles 21 to 26. However, in case of the actual label 100, it is impossible to know the number and position information of the first reflection particles and the number, position information and posture information of the second reflection particles. For that reason, the first reflection particles and/or the second reflection particles may be included in the grid coordinates of the equal reflection regions and the grid coordinates of the biased reflection regions. Due to the reflection characteristics of the reflection particles, the first reflection particles are included in most of the equal reflection regions and the second reflection particles are included in most of the biased reflection regions. By appropriately setting the reference values K1, K2 and K3 for brightness comparison through tests, it is possible to control the number of the equal reflection regions and the number of the biased reflection regions.

As described above, if the method for generating the authentication code of the label 100 according to the present invention is applied to the label 100 including a plurality of first reflection pattern forming bodies which reflects a substantially identical reflection pattern regardless of the direction of irradiated light and a plurality of second reflection pattern forming bodies which is randomly disposed in a carrier layer to reflect a reflection pattern changed depending on the direction of irradiated light, it is possible to stably extract a substantially comparable authentication code from the reflection patterns (physical features) unique to the label 100. That is to say, if two authentication codes PA(i,j) and PT(i,j) are obtained by taking two images of the same label 100 at different locations under different imaging conditions, the two authentication codes PA(i,j) and PT(i,j) may differ from each other due to the difference in the imaging conditions. Since the two authentication codes PA(i,j) and PT(i,j) are obtained by finding the difference in brightness between two normalized images, both of the two authentication codes PA(i,j) and PT(i,j) include reflection pattern features unique to the label 100. Accordingly, the authenticity of the label 100 can be determined by comparing the reflection pattern features included in both of the two authentication codes PA(i,j) and PT(i,j). Description will now be made on a method for authenticating the label 100 using the two authentication codes PA(i,j) and PT(i,j).

Third Invention

Method for Authenticating a Product Authentication Label

Hereinafter, description will be made on a method for indirectly determining copying or non-copying of a product through the determination of authenticity of the label 100 in case where the label 100 shown in FIG. 5 is affixed to a product.

Figure 10:
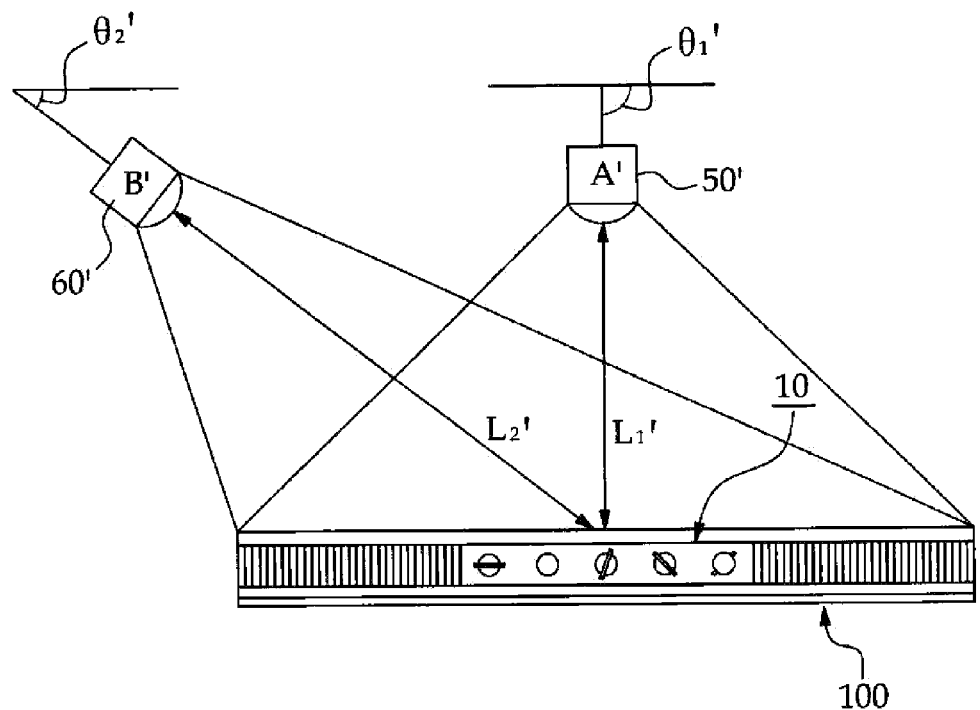
FIG. 10 is a schematic diagram showing the arrangement of cameras for taking test images of a product to which the label shown in FIGS. 2A and 2B is affixed.

FIG. 10 shows a state in which the label 100 is imaged by two cameras 50' and 60' to authenticate a product to which the label 100 is affixed. The two cameras 50' and 60' shown in FIG. 10 differ from the two cameras 50 and 60 shown in FIG. 5. Even if one attempts to install the cameras 50' and 60' shown in FIG. 10 in the same arrangement with respect to the label 100 as that of the cameras 50 and 60 shown in FIG. 5, an error occurs in the arrangement of the cameras. Accordingly, the arrangement conditions of the cameras 50' and 60' shown in FIG. 10, namely the distances L1' and L2' from the cameras 50' and 60' to the label 100 and the angles θ1' and θ2' of the cameras 50' and 60' with respect to the label 100, slightly differ from those of the cameras 50 and 60 shown in FIG. 5.

Figure 11A:
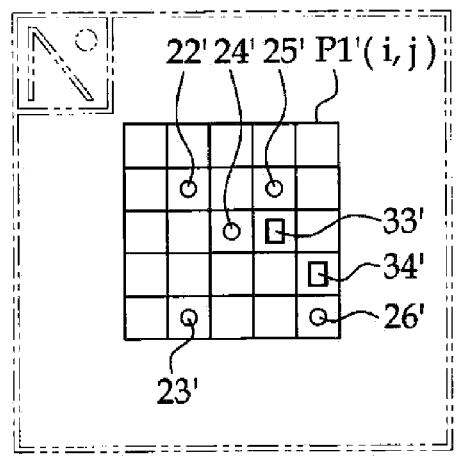
FIGS. 11A and 11B are schematic diagrams showing reflection particles appearing in the respective test images taken with two cameras shown in FIG. 10.
Figure 11B:
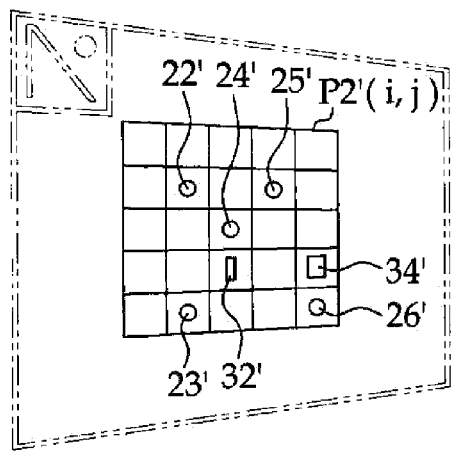

FIGS. 11A and 11B show two mutually-different images of the label 100 taken with the camera A' 50' and the camera B' 60'. As shown in 11A and 11B, the reflection pattern image P1'(i,j) of the label 100 taken with the camera A' 50' has a rectangular shape but slightly differs in size and shape from the image P1(i,j) taken with the camera A 50 shown in FIG. 6. The reflection pattern image P2'(i,j) of the label 100 taken with the camera B' 60' has a trapezoidal shape but slightly differs in size and shape from the image P2(i,j) taken with the camera B 60 shown in FIG. 6. In the following description, the images P1'(i,j) and P2'(i,j) shown in FIGS. 11A and 11B will be referred to as two mutually-different test images.

Figure 12A:
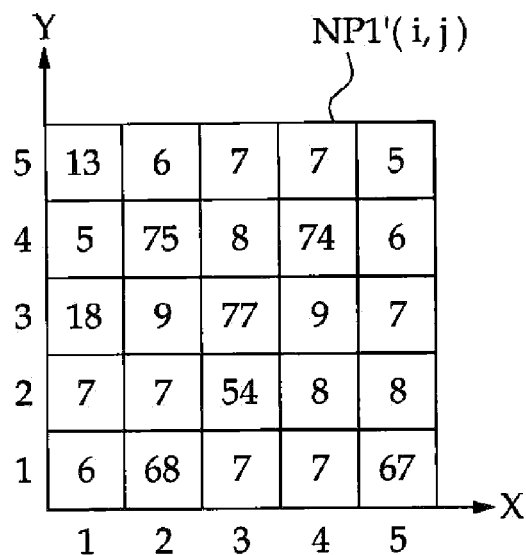
FIGS. 12A and 12B are explanatory views showing the normalized state of the test images shown in FIGS. 11A and 11B and the brightness numerically expressed in a grid coordinate.
Figure 12B:
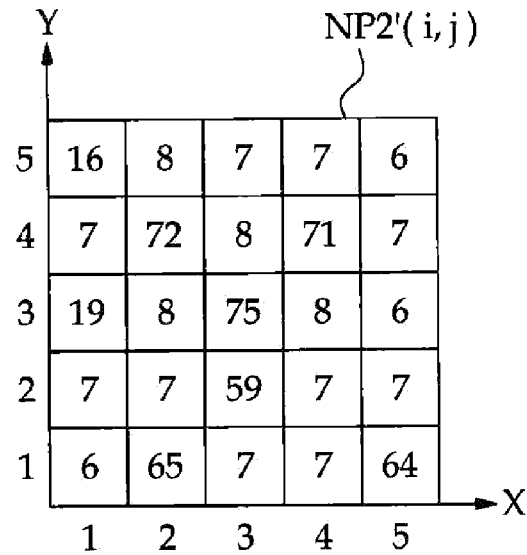

FIGS. 12A and 12B show two test images which are normalized in order to compare the brightness values of the corresponding grid coordinates of the two test images P1'(i,j) and P2'(i,j). In the following description, the two normalized test images shown in FIGS. 12A and 12B will be referred to as normalized test images and will be indicated by NP1'(i,j) and NP2'(i,j), respectively. Just like the normalized registration images shown in FIGS. 7A and 7B, the grids shown in FIGS. 12A and 12B indicate the grid coordinates of the normalized test images. The numerals existing within the grid coordinates indicate the brightness of the grid coordinates of the normalized test images. Comparing FIGS. 12A and 12B with FIGS. 6A and 6B, it can be noted that the corresponding grid coordinates of the normalized images differ in brightness from each other because the imaging conditions of the registration images P1(i,j) and P2(i,j) of the label 100 are different than the imaging conditions of the test images P1'(i,j) and P2'(i,j). However, the images are obtained from the label having the same reflection pattern (physical property). Therefore, the two normalized registration images NP1(i,j) and NP2(i,j) and the two normalized test images NP1'(i,j) and NP2'(i,j) show no large difference in the brightness of the corresponding grid coordinates. Accordingly, if the authentication codes are found by applying the authentication code generating method according to the present invention to the normalized registration images and the normalized test images, it is possible to find similar authentication codes.

Figure 13:
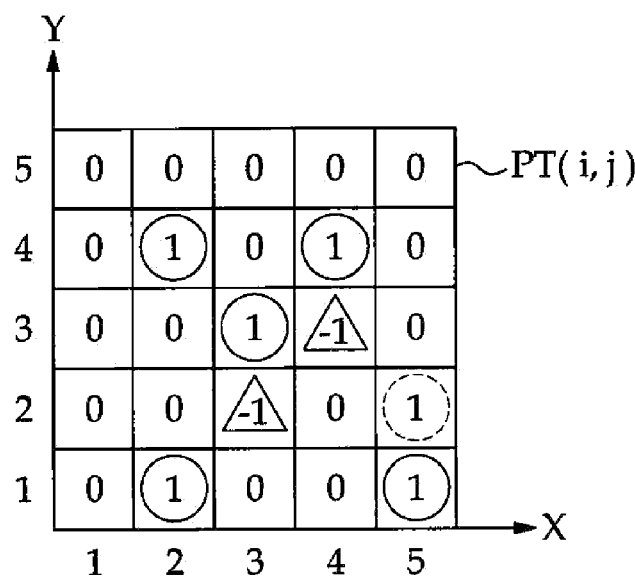
FIG. 13 is an explanatory view of a test authentication code obtained by comparing two normalized test images shown in FIGS. 12A and 12B.

FIG. 13 shows the position information of equal reflection particles and the position information of biased reflection particles which are obtained by comparing the brightness values of the corresponding grids of two mutually-different normalized test images shown in FIGS. 12A and 12B. The authentication code PT(i,j) of the label 100 shown in FIG. 13 will be referred to as a test authentication code.

The same value as the brightness difference comparison reference value used when finding the registration authentication code shown in FIG. 8 is used as a brightness difference comparison reference value for classifying the grid coordinates of the test authentication code shown in FIG. 13 into an equal reflection region, a biased reflection region and a blank region. The method for finding the test authentication code PT(i,j) shown in FIG. 13 is the same as the method for finding the test authentication code PA(i,j) shown in FIG. 8 and therefore will not be described in detail.

Referring to FIG. 13, the number of equal reflection regions is six. The grid coordinates at which the respective equal reflection regions are positioned are PT(2,1), PT(2,4), PT(3,3), PT(4,4), PT(5,1) and PT(5,2). The number of biased reflection regions is two. The grid coordinates at which the respective biased reflection regions are positioned are PT(3,2) and PT(4,3). Comparing the registration authentication code shown in FIG. 8 and the test authentication code shown in FIG. 13, it can be noted that the grid coordinates PA(1,3) and PA(1,5) shown in FIG. 8 are classified into the equal reflection regions but the corresponding grid coordinates PT(1,3) and PT(1,5) shown in FIG. 13 are classified into the blank regions. Furthermore, the grid coordinates PA(4,3) shown in FIG. 8 is classified into the blank region but the corresponding grid coordinates PATTERN(4,3) shown in FIG. 13 is classified into the biased reflection region.

This difference occurs due to the fact that the imaging conditions such as the camera installation positions and the illumination used when taking the registration images differ from those used when taking the test images and further that the first reflection particles and the second reflection particles differing in reflection property from each other are contained in the label 100. The same result can be obtained even if foreign materials adhere to the portions of the grid coordinates PT(1,3) and PT(1,5) when taking the test images and even if the label 100 is damaged. However, the registration authentication code PA(i,j) and the test authentication code PT(i,j) are generated based on the physical properties of the same label 100 and can share the physical properties of the label 100 to some extent. That is to say, as can be noted from the comparison of FIG. 8 and FIG. 13, the grid coordinates corresponding to six equal reflection regions are coincident and the grid coordinates corresponding to one biased reflection region is coincident.

Figure 14:
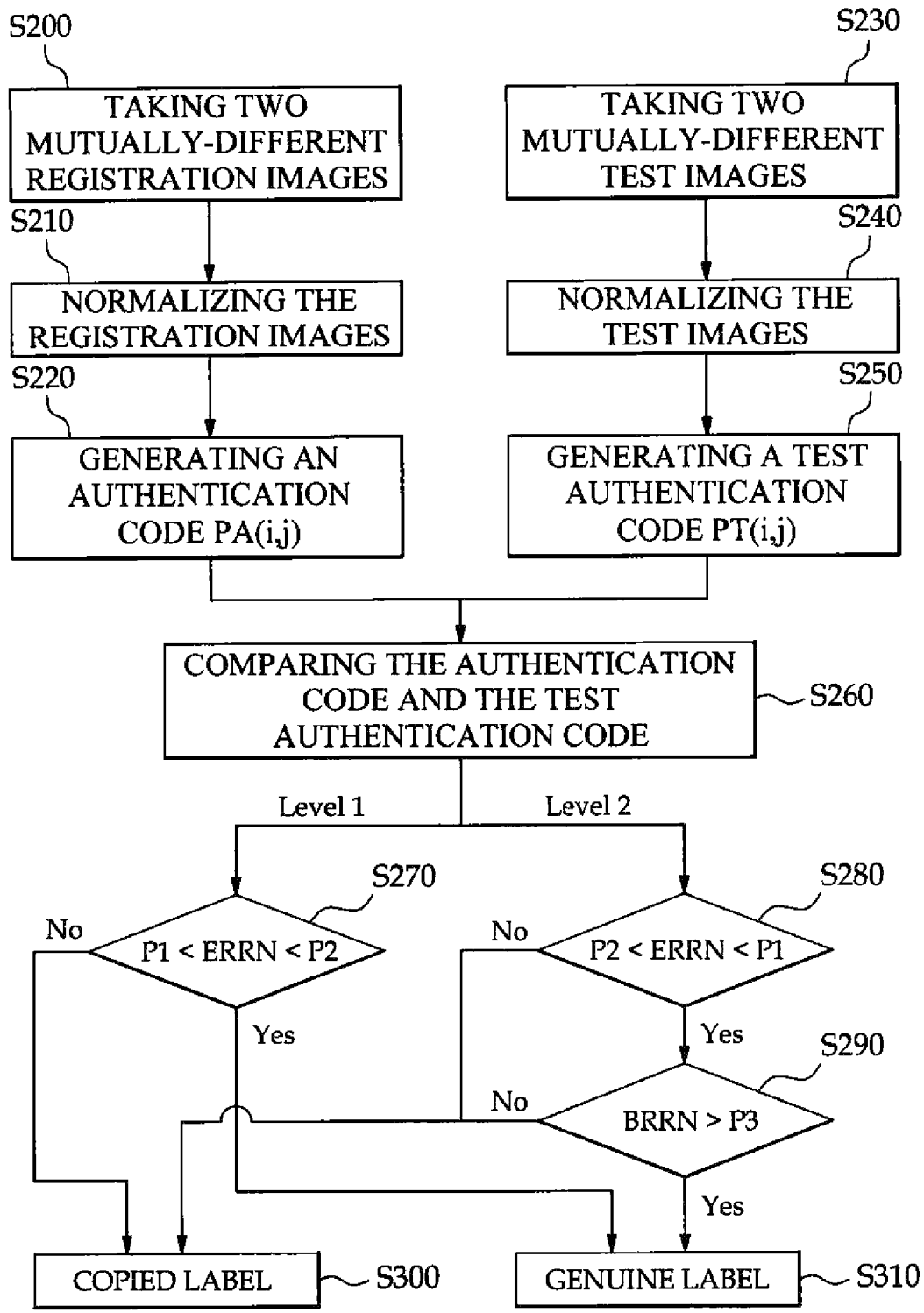
FIG. 14 is a flowchart illustrating a method for authenticating a product authentication label according to the present invention.

Hereinafter, a method for determining whether the product authentication label 100 shown in FIG. 10 and affixed to a product is identical with the product authentication label 100 shown in FIG. 5 and used in registration will be described with reference to FIG. 14.

In order to authenticate a specific label 100, two registration images are first taken under different imaging conditions (S200). The two registration images thus taken are normalized (S210). A registration authentication code PA(i,j) is generated by finding the difference in brightness of the grid coordinates through the use of the two normalized registration images (S220).

Next, at a location where the label 100 is to be authenticated, two mutually-different test images of the label 100 are taken under different imaging conditions (S230). The two test images thus taken are normalized (S240). A test authentication code PT(i,j) is generated by finding the differences in brightness between the grid coordinates through the use of the two normalized test images (S250). The grid coordinates used when generating the registration authentication code and the grid coordinates used when generating the test authentication code need to be identical in size.

Next, the number of the equal reflection regions having the same grid coordinates (ERRN: Equal Reflection Region Number) and the number of the biased reflection regions having the same grid coordinates (BRRN: Biased Reflection Region Number) are found by comparing the registration authentication code PA(i,j) with the test authentication code PT(i,j) (S260). In the registration authentication code PA(i,j) shown in FIG. 8, the grid coordinates of the equal reflection regions are PA(1,3), PA(1,5), PA(2,1), PA(2,4), PA(3,3), PA(4,4), PA(5,1) and PA(5,2). In the test authentication code PT(i,j) shown in FIG. 13, the grid coordinates of the equal reflection regions are PT(2,1), PT(2,4), PT(3,3), PT(4,4), PT(5,1) and PT(5,2). Thus, the number of the equal reflection regions having the coincident grid coordinates is six, the grid coordinates of which are PT(2,1), PT(2,4), PT(3,3), PT(4,4), PT(5,1) and PT(5,2). Comparing FIG. 8 with FIG. 13, it can be noted that the number of the biased reflection regions having the coincident grid coordinates is one, the grid coordinates of which is PT(1,3).

Next, in case of an ordinary security level (level 1), determination is made as to whether the number of the equal reflection regions having the same grid coordinates (ERRN)

falls within a predetermined numerical range (whether P1<ERRN<P2) (S270). If the ERRN falls within the predetermined numerical range, it is determined that the label 100 is a genuine label (S310). If the ERRN does not fall within the predetermined numerical range, it is determined that the label 100 is a copied label (S300).

In case where the security level for authentication of the label 100 is to be set higher (level 2), determination is first made as to whether the number of the equal reflection regions having the same grid coordinates (ERRN) falls within a predetermined numerical range (whether P1<ERRN<P2) (S280). If the ERRN does not fall within the predetermined numerical range, it is determined that the label 100 is a copied label (S300). If the ERRN falls within the predetermined numerical range, determination is made again as to whether the number of the biased reflection regions having the same grid coordinates (BRRN) is larger than a predetermined numeral P3. If the BRRN is larger than the predetermined number, it is determined that the label 100 is a genuine label (S310). If the BRRN is equal to or smaller than the predetermined number, it is determined that the label 100 is a copied label (S300).

If the range of the number of the equal reflection regions having the same grid coordinates for the determination of authenticity of the label 100 is set at a range of 3<ERRN<7, the label 100 of the present embodiment is determined to be a copied label. At a higher security level, if the range of the number of the equal reflection regions having the same grid coordinates is set at a range of 3<ERRN<7 and if the range of the number of the biased reflection regions having the same grid coordinates is set at a range of BRRN>0, the label 100 of the present embodiment is determined to be a genuine label. If the range of the number of the biased reflection regions having the same grid coordinates is set at a range of BRRN>1, the label 100 of the present embodiment is determined to be a copied label. The range of the number of the equal reflection regions having the same grid coordinates and the range of the number of the biased reflection regions having the same grid coordinates, which make it possible to stably perform authentication, can be experimentally set depending on the kinds of labels. Alternatively, the range of the number of the equal reflection regions having the same grid coordinates and the range of the number of the biased reflection regions having the same grid coordinates may be differently set depending on the security level of the label.

The method for authenticating the label 100 according to the present invention is stable in terms of the probability. In the present embodiment, the label 100 includes a carrier layer 11 which is formed by mixing first reflection particles and second reflection particles with a liquid synthetic resin and solidifying the synthetic resin. Thus, the position of the first reflection particles and the position and posture of the second reflection particles are decided at random. Accordingly, if it is assumed that the number of the reflection particles contained in the label 100 is sufficiently large, there is little probability that a plurality of labels accurately coinciding in the position information of the first reflection particles and the second reflection particles is manufactured.

For example, it is assumed that the longitudinal and transverse dimension of the carrier layer 11 of the label 100 is 10×10 mm, the diameter of spherical particles is 100 μm, and the longitudinal and transverse dimension of flakes is 100 μm. It is also assumed that 50 first reflection particles and 50 second reflection particles are randomly distributed in the label 100. If the carrier layer 11 is divided into grids each having the longitudinal and transverse dimension of 0.1×0.1 mm, the total number of grinds is 10,000 (100×100). The number of unique labels that can be manufactured by disposing 100 particles having a dimension of 100 μm in 10,000 grids is expressed by $_{10,000}C_{100}$=10,000×9999× ... 9901×9900/100×99× ... 3×2×1. That is to say, the number of labels having differently disposed particles is an extremely large number expressed by $_{10,000}C_{100}>(9900/100)^{100}>99^{100}$. Thus, the probability of the same label being manufactured is an extremely small number expressed by $1/_{10,000}C_{100}<1/99^{100}$. In addition, the light reflection direction of 50 second reflection particles varies depending on the arrangement postures thereof in the carrier layer 11 as well as the positions thereof. Accordingly, it can be said that the probability of the same label being manufactured is substantially zero. It is technically quite difficult or almost impossible to copy a label such that not only the positions of the spherical first reflection particles but also the postures of the flake-shaped second reflection particles are substantially coincident. For that reason, there is little possibility that the same label as the label 100 of the present embodiment is manufactured. It can be said that it is technically almost impossible to manufacture a label identical with or similar to the previously manufactured one.

In conclusion, the label 100 according to the present invention is very difficult to copy. Since the distribution of particles is decided at random, a stable authentication result can be obtained in terms of the probability even if authentication is performed by comparing the registration authentication code with the test authentication code and using the number of the equal reflection regions having the same grid coordinates. For example, when the label contains 50 first reflection particles, a sufficiently stable authentication result can be obtained even if the label is recognized as a genuine label in case where 30 to 40 equal reflection regions having the same grid coordinates are coincident in the registration authentication code and the test authentication code. Furthermore, the label can be authenticated at a higher security level if the label is recognized as a genuine label in case where 30 to 40 equal reflection regions having the same grid coordinates are coincident in the registration authentication code and the test authentication code and in case where the number of the biased reflection regions having the same grid coordinates is five or more.

Figure 15:
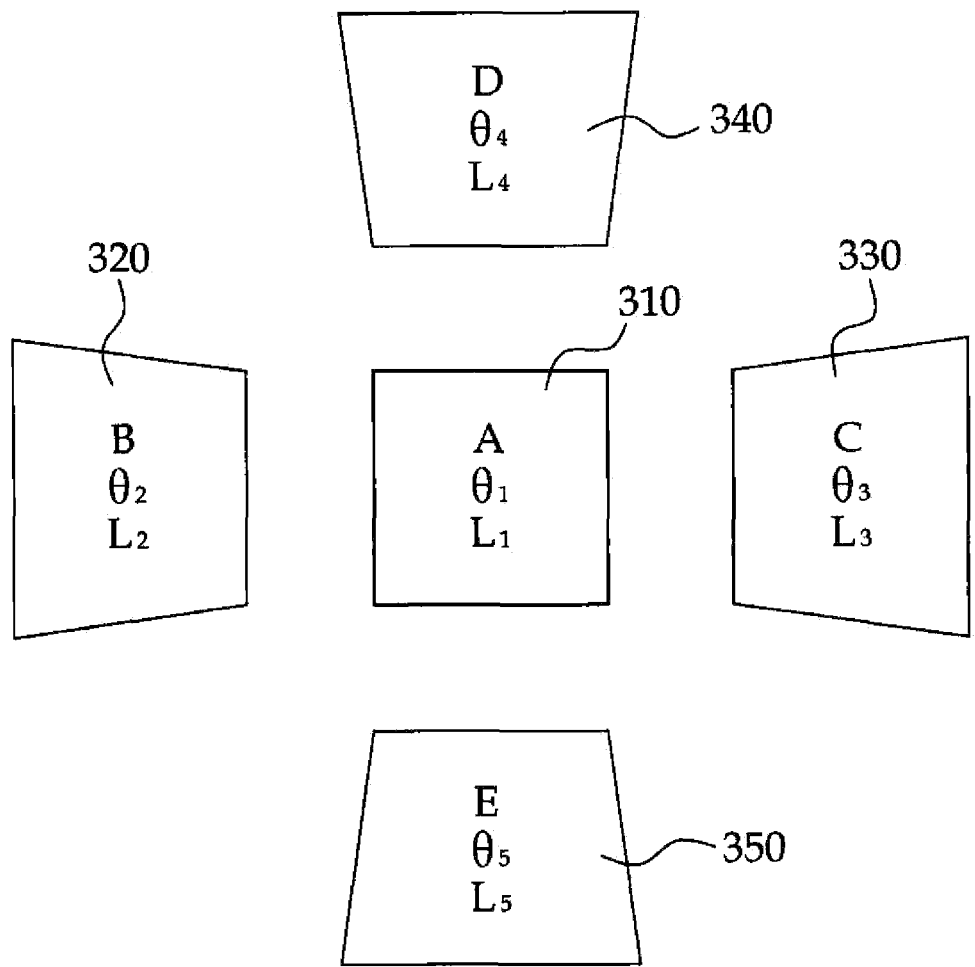
FIG. 15 is a schematic diagram showing five label images which differ from one another.

FIG. 15 shows five mutually-different registration images 310 to 350 (A, B, C, D and E) obtained by imaging the label 100 with five cameras installed at different positions. The five registration images shown in FIG. 15 can be used in an effort to increase the security level and the stability of authentication which authenticating the label 100.

First, for the purpose of increasing the stability of authentication, the grid coordinates of the equal reflection regions can be found by normalizing the five mutually-different registration images and comparing the normalized registration images with the authentication code PA(i,j). In the grid coordinate information of the equal reflection regions extracted from the five mutually-different registration images, the differences in brightness of the test images taken in five directions fall within a predetermined range. Thus, authentication can be performed even if the imaging conditions of the test images are less strict.

Furthermore, the five mutually-different registration images can be used in an effort to increase the authentication security level. For example, a plurality of authentication codes can be generated by selecting two of the five mutually-different registration images. As an example, four authentication codes are generated using four combinations of registration images (A,B), (A,C), (A,D) and (A,E) and are stored in an authentication server. In case of taking the test images, a test authentication code is generated by taking the test images according to one of the four image combinations. In this case, it becomes more difficult to copy the label if the selection of the image combinations is made unpredictable. The information on the image combinations to be selected when taking the test images includes the distance information L1, L2, L3, L4 and L5 and the direction information θ1, θ2, θ3, θ4 and θ5 of the cameras with respect to the label. This information may be previously inputted to a reader for taking the test images and may be randomly selected by a program.

In the present embodiment, a plurality of mutually-different test images is used in order to generate a test authentication code. In another embodiment, a test authentication code may be generated by taking only one test image and selecting one of the registration images. In case where only one test image is taken, it is possible to shorten the time required in authenticating the label.

Fourth Invention

System for Authenticating a Product Authentication Label

Figure 16:
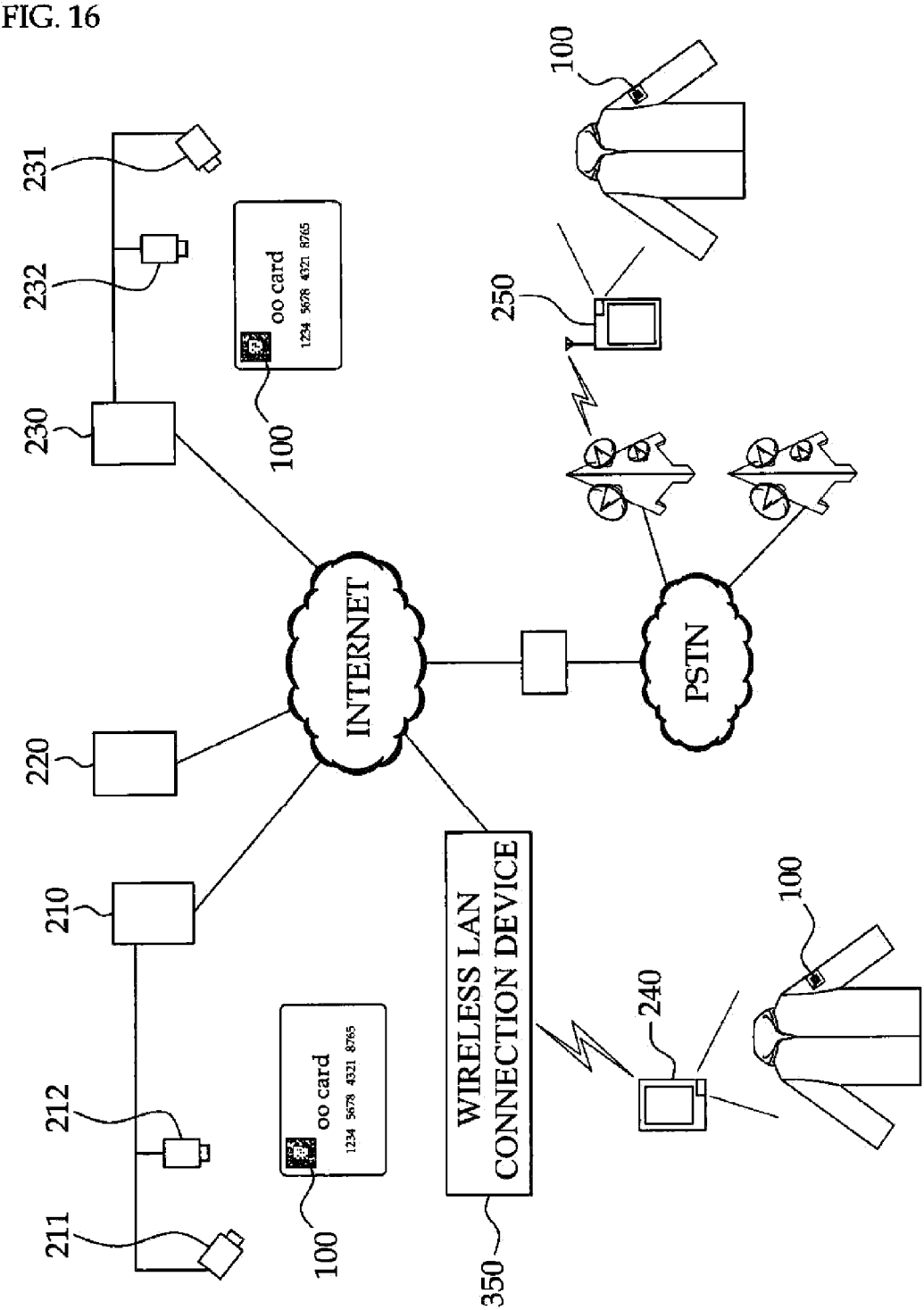
FIG. 16 is a schematic diagram of a system for authenticating a product authentication label according to the present invention.

FIG. 16 is a schematic diagram of a system for registering an authentication code of another label 100 and determining through the Internet the authenticity of the label 100 for which the authentication code is registered.

The system for authenticating a product authentication label according to the present invention includes a label registration device 210, a label reader 230 and an authentication server 220.

Figure 17:
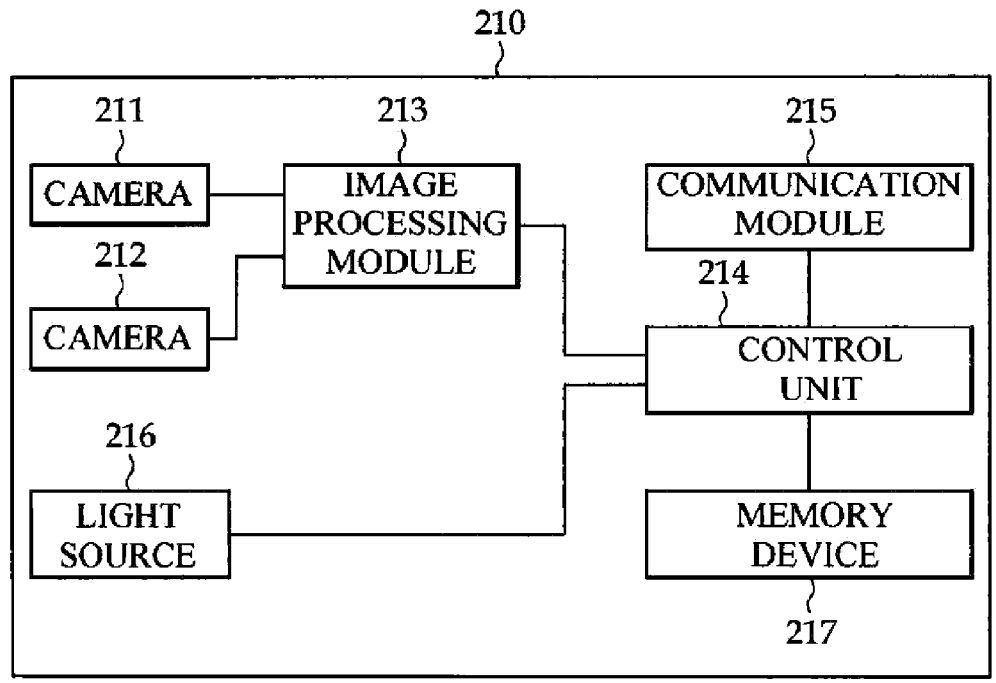
FIG. 17 is a block diagram showing one embodiment of a label registration device according to the present invention.

Referring to FIGS. 16 and 17, the label registration device 210 is installed at a location where the label 100 is to be registered. The label registration device 210 is connected to the Internet. The label registration device 210 includes two cameras 211 and 212, an image processing module 213 for processing registration images of the label 100 taken by the cameras 211 and 212, and a communication module 215 connected to the Internet and configured to transmit a processed authentication code and/or the registration images to the authentication server 220.

As described above in respect of FIGS. 5 to 9, the image processing module 213 generates an authentication code of the imaged label 100 by receiving two mutually-different registration images from the cameras 211 and 212, normalizing the registration images and comparing the normalized registration images. The authentication code contains the position information (grid coordinates) of equal reflection regions and the position information (grid coordinates) of biased reflection regions which are obtained by normalizing two mutually-different registration images and comparing the normalized registration images. The image processing module 213 extracts a label identification code from the registration images of the label 100. The label identification code is contained in a pattern formed in the label identification code layer 14 of the label 100.

The communication module 215 transmits the authentication code and the label identification code of a specific label 100 and/or the normalized registration images to the authentication server 220 through the Internet. A control unit 214 controls the operations of the image processing module 213 and the communication module 215. Furthermore, the control unit 214 controls a light source 216 in order to obtain clear registration images. A memory device 217 temporarily stores the registration images, the authentication code and the label identification code of the imaged label 100.

Figure 18:
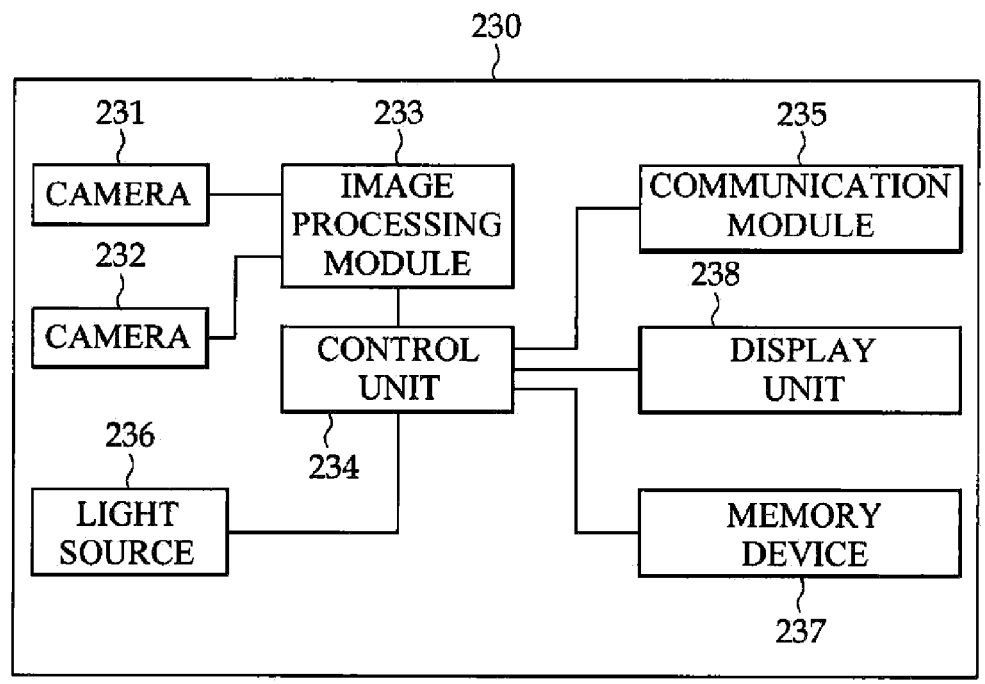
FIG. 18 is a block diagram showing one embodiment of a label reader according to the present invention.

Referring to FIGS. 16 and 18, the label reader 230 is installed in a location where the authenticity of a product having the label 100 is to be determined. The label reader 230 is connected to the Internet. For example, if the product having the label is a credit card as shown in FIG. 16, the label reader 230 may be installed within an ATM (Automatic Teller Machine). The label reader 230 includes two cameras 231 and 232, an image processing module 233 for processing test images of the label 100 taken by the cameras 231 and 232, a communication module 235 for transmitting a test authentication code and/or the test images to the authentication server 220, and a display unit 238.

As described above in respect of FIGS. 5 to 9, the image processing module 233 generates a test authentication code of the label 100 by receiving the test images from the cameras 231 and 232, normalizing the test images and comparing the normalized test images. The test authentication code contains the position information (grid coordinates) of equal reflection regions and the position information (grid coordinates) of biased reflection regions which are obtained by comparing the normalized test images. The image processing module 233 extracts a label identification code from the test images of the label 100. The label identification code is contained in a pattern formed in the label identification code layer 14 of the label 100.

The communication module 235 transmits the test authentication code and the label identification code of the image label 100 to the authentication server 220 through the Internet. The label identification code contains an Internet address of the authentication server 220 or an Internet address of a directory server 280. A control unit 234 controls the image processing module 233 and the communication module 235. Furthermore, the control unit 234 controls a light source 236 in order to obtain clear test images. A memory device 237 temporarily stores the test images, the test authentication code and the label identification code of the imaged label 100. The control unit 234 causes the display unit 238 to display the determination results of the authenticity of the label 100 transmitted from the authentication server 220.

Alternatively, prior to requesting the authentication server 220 to authenticate the label 100, the label reader 230 may independently determine whether the label 100 is a label copied by printing. In this case, the control unit 234 calculates the number of the equal reflection regions contained in the test authentication code and determines whether the number of the equal reflection regions falls within a predetermined range. If the number of the equal reflection regions does not fall within the predetermined range, the control unit 234 determines the label 100 to be a copied (printed) label and displays the determination results on the display unit 238. If the number of the equal reflection regions falls within the predetermined range, the control unit 234 transmits the label identification code and the test authentication code to the authentication server 220 and displays the authentication results received from the authentication server 220 on the display unit 238.

The authentication server 220 is connected to the Internet. The label identification code, the authentication code and the registration images of the label 100 received from the label registration device 210 are stored in the database of the authentication server 220. The authentication server 220 receives a request for authentication of the label 100 from the label reader 230 and received the label identification code and the test authentication code from the label reader 230. Upon receiving the request for authentication of the label 100, the authentication server 220 first checks whether the label identification code is registered in the database. If the label 100 is a registered label, the authentication server 220 finds the number of the equal reflection regions having coincident grid coordinates (position information) by comparing the authentication code stored in the database with the test authentication code transmitted from the label reader 230. If the number of the equal reflection regions having coincident grid coordinates (position information) falls within a predetermined range, the label 100 is determined to be a genuine label. If the number of the equal reflection regions having coincident grid coordinates (position information) does not fall within the predetermined range, the label 100 is determined to be a copied or false label. The authentication server 220 transmits the determination results to the label reader 230.

Alternatively, if the label 100 is required to be authenticated at a higher security level, the authentication server 220 may determine the authenticity of the label by finding both the number of the equal reflection regions having coincident grid coordinates and number of the biased reflection regions having coincident grid coordinates. That is, to say, the determination criteria can be set such that the label 100 is determined to be a genuine label if the number of the equal reflection regions having coincident grid coordinates falls within a predetermined range and if the number of the biased reflection regions having coincident grid coordinates falls within a predetermined range. In order for the authentication server 220 to find the number of the biased reflection regions having coincident grid coordinates, it is required that the imaging conditions of the registration images and the test images, namely the distances and directions of the cameras with respect to the label 100, be substantially coincident. The imaging conditions of the registration images shown in FIG. 5 and the imaging conditions of the test images shown in FIG. 10, e.g., the distances L1 and L1' or L2 and L2' and the directions θ1 and θ1' or θ2 and θ2, need to be substantially equal to each other without departing from an installation/operation error range of the device. Moreover, it is preferred that the light sources of the cameras are substantially similar to each other.

In another embodiment, the system for authenticating a product authentication label according to the present invention includes a label registration device 210, a label reader 230, a directory server 280 and an authentication server 220. The directory server 280 receives the label identification information from the label reader 230 or a portable terminal 250 and supplies the address of the authentication server 220 to the label reader 230 or the portable terminal 250. The directory server 280 is needed in case where there exists a plurality of authentication servers which is managed on a product-by-product basis or a manufacturer-by-manufacturer basis.

Fifth Invention

Portable Terminal for Authenticating a Product Authentication Label

As shown in FIG. 16, the product authentication label 100 according to the present invention may be authenticated using portable wireless terminal 240 or 250 provided with a camera. In FIG. 16, the portable wireless terminal 250 is a cellular phone such as a smart phone or the like and the portable wireless terminal 240 is a wireless Internet connection device such as an ipad or the like.

If the product authentication label 100 according to the present invention is authenticated by the portable wireless terminal 250, it is possible for an ordinary consumer to personally determine the authenticity of a product at a product purchasing spot. This makes it possible to enhance the trading reliability and to perform the authentication regardless of locations. Moreover, it is not necessary to use a dedicated device for the authentication of a label. This makes it possible to reduce the authentication cost.

Figure 19:
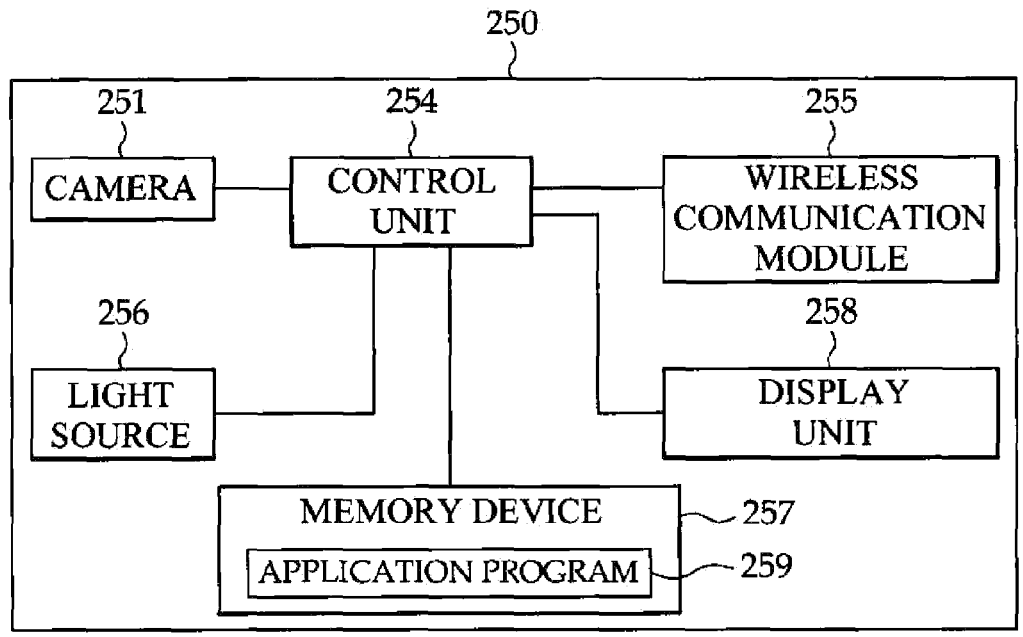
FIG. 19 is a block diagram showing a portable terminal for label authentication according to the present invention.

FIG. 19 is a schematic diagram of the portable wireless terminal 250 for authenticating a product authentication label 100 according to the present invention. The portable wireless terminal 250 according to the present invention includes a control unit 254, a display unit 258, a camera 251, a memory device 257 and a wireless communication module 255. A label-authenticating application program 259 is stored in the memory device 257.

Figure 20:
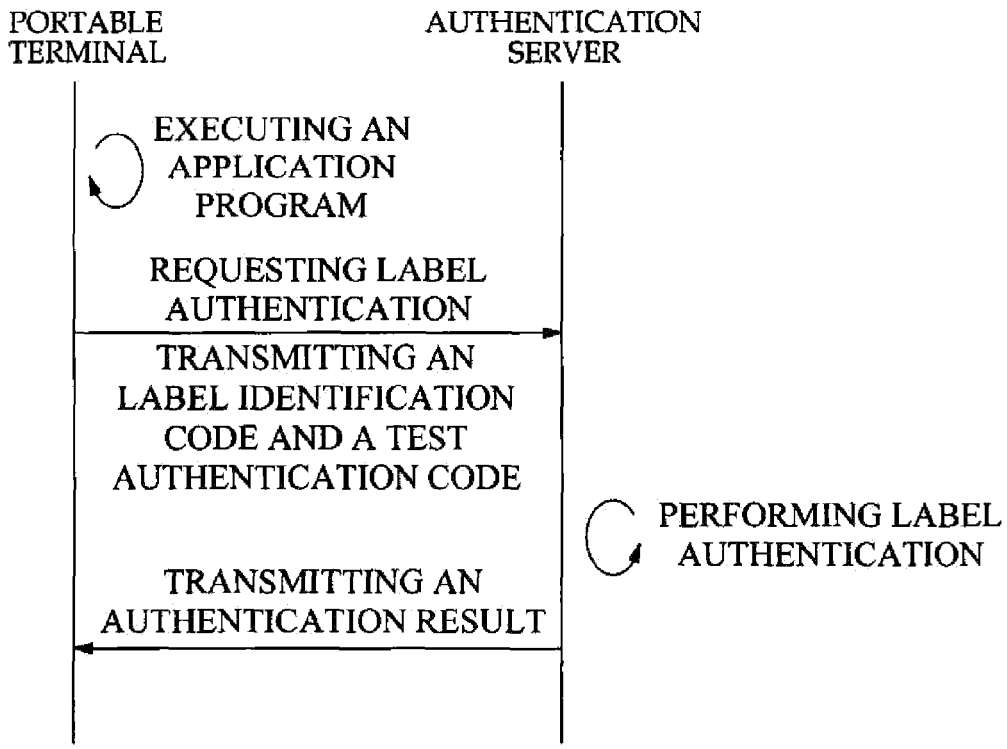
FIG. 20 is an explanatory view illustrating a routine for authenticating a label with a portable terminal according to the present invention.

FIG. 20 is a schematic diagram illustrating a routine for authenticating a label 100 with the portable terminal 250 according to the present invention. The label authenticating application program 259 is executed. Two mutually-different test images of the label 100 to be authenticated are taken by the camera 251 of the portable terminal 250. The label-authenticating application program 259 processes the test images thus taken, reads a label identification code and generates a test authentication code. The portable terminal 250 transmits the label identification code and the test authentication code to the authentication server 220 and requests the authentication server 220 to authenticate the label 100. The authentication server 220 checks whether the received label identification code is the label identification code registered in the database. If the received label identification code is the registered label identification cod; the authentication server 220 performs the authentication of the label 100 by comparing the registration authentication code with the test authentication code and transmits the authentication results to the portable terminal 250. The portable terminal 250 displays the received authentication results on the display unit 258 thereof.

Figure 21:
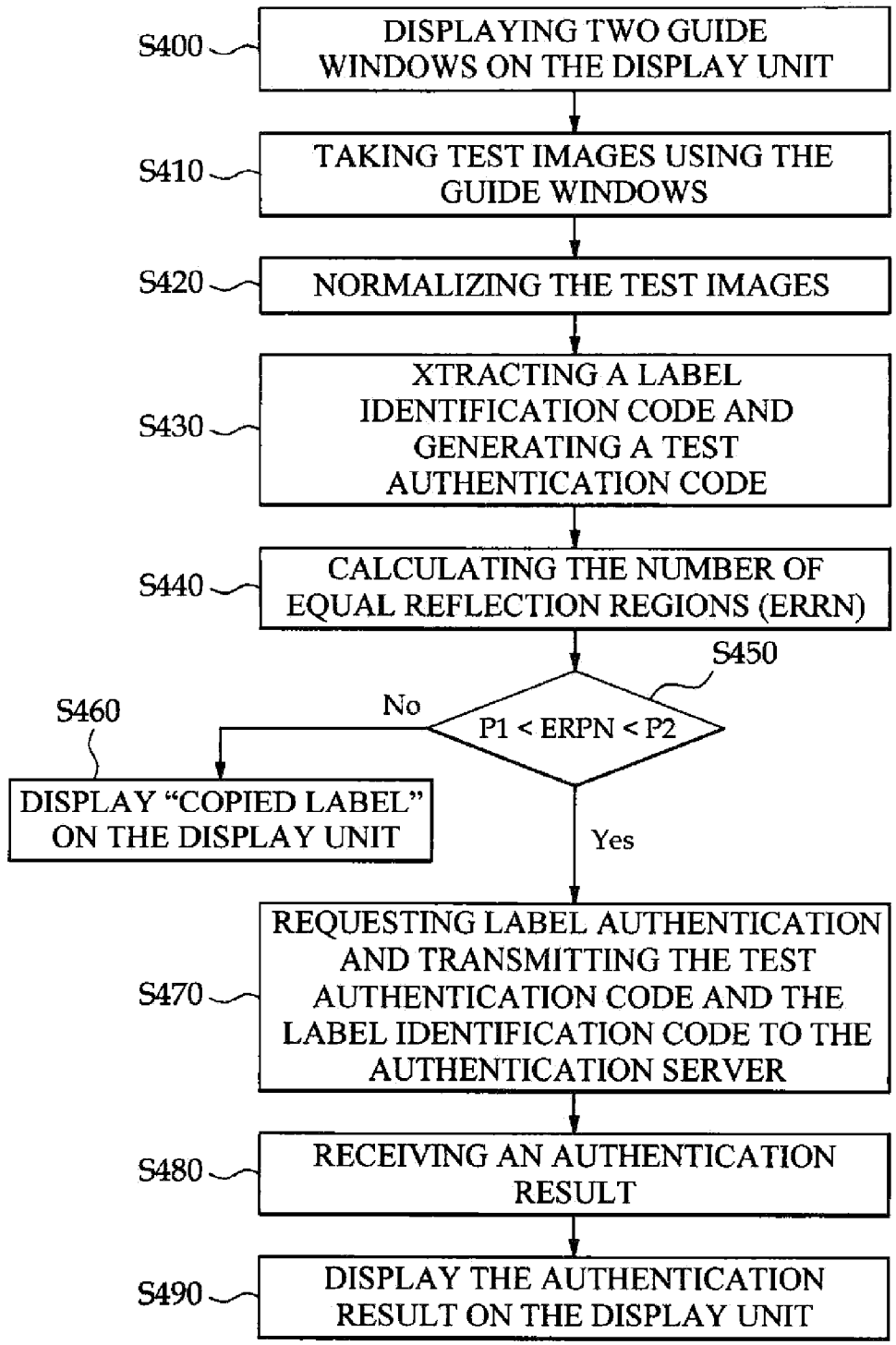
FIG. 21 is a flowchart illustrating a routine of an application program executed in a portable terminal according to the present invention.

FIG. 21 is a flowchart illustrating a routine of the application program executed in the portable terminal according to the present invention. Description will now be made on a routine of the label-authenticating application program 259 executed in the portable terminal 250.

If a user executes the label-authenticating application program 259 stored in the memory device 257 of the portable terminal 250, the label-authenticating application program 259 causes the display unit 258 to display two guide windows for use in taking the test images of the label 100 (S400). The guide windows are used to assist a user in imaging the label 100 with the camera 251 of the portable terminal 250. The guide windows provide an interface to the user of the portable terminal 250 so that the user can take an image of the label 100 at a specified position.

Figure 22:
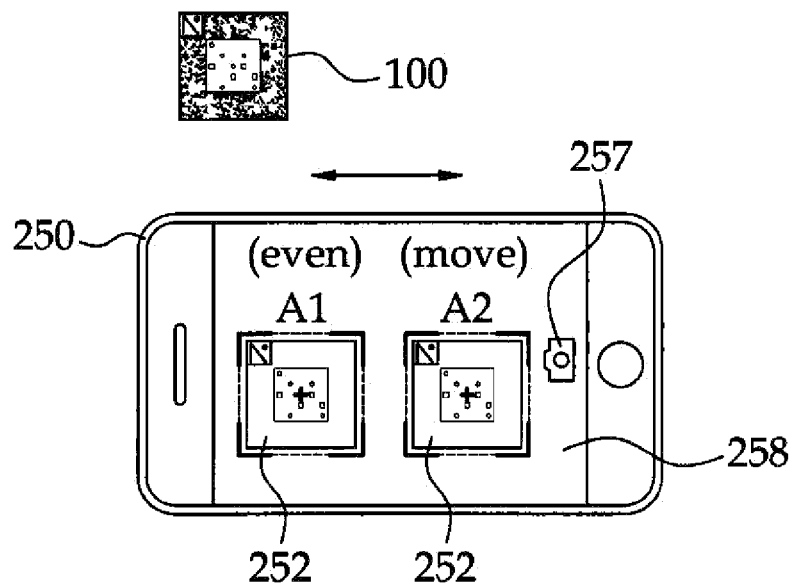
FIG. 22 is a schematic diagram showing one example of a label imaging interface provided by a cellular phone according to the present invention.
Figure 23:
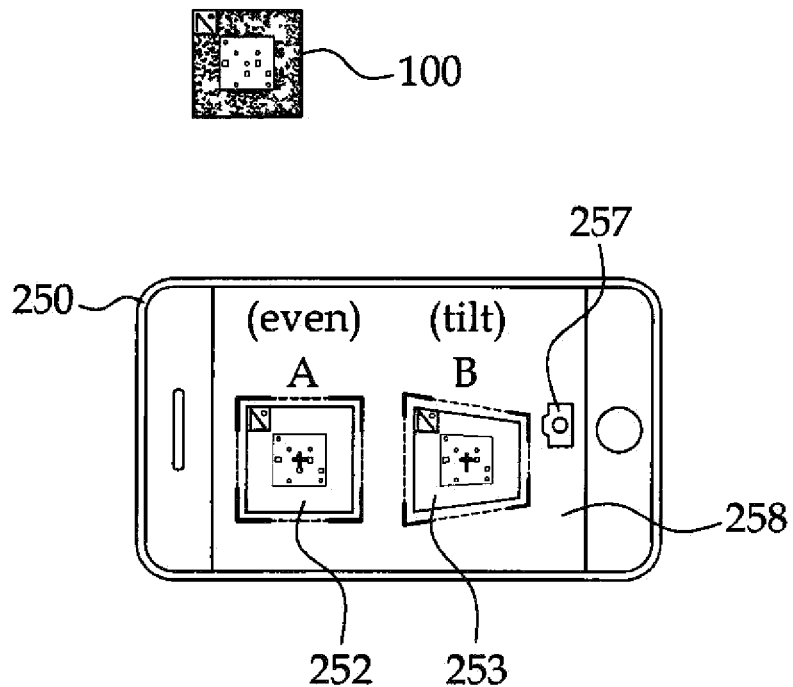
FIG. 23 is a schematic diagram showing another example of a label imaging interface provided by a cellular phone according to the present invention.
Figure 24:
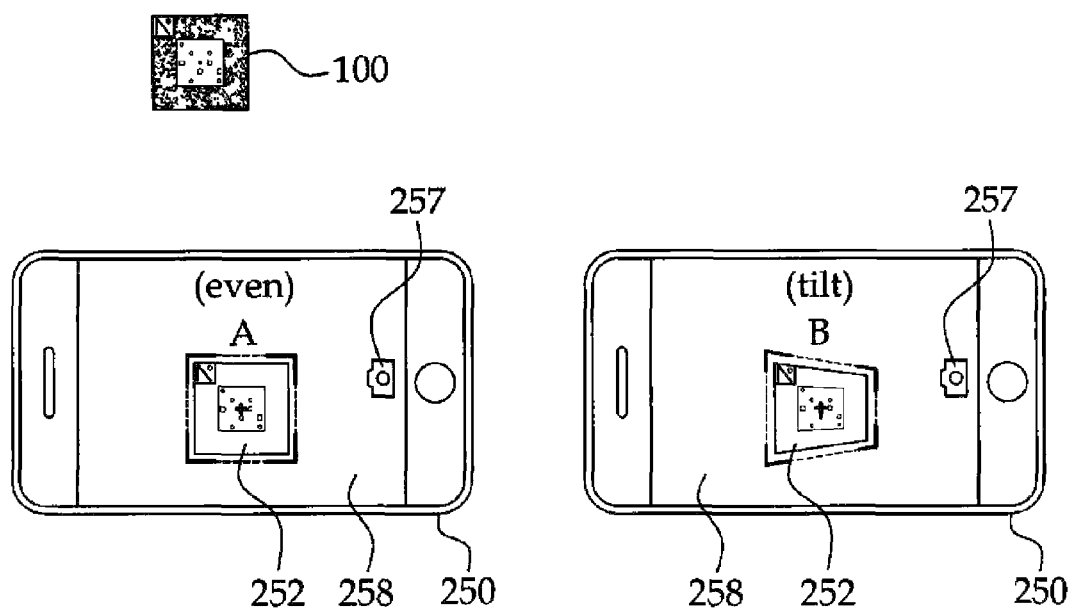
FIG. 24 is a schematic diagram showing a further example of a label imaging interface provided by a cellular phone according to the present invention.

Referring to FIGS. 22 to 24, different examples of the guide windows displayed on the display unit 258 of the portable terminal 250 will now be described. FIG. 22 shows an example of the portable terminal 250 in which two guide windows having the same shape are displayed on the display unit 258. A touch screen is installed in the display unit 258. Two guide windows having a rectangular shape for taking two mutually-different images, namely a left guide window A1 252 and a right guide window A2 252, are displayed on the display unit 258. The user places the camera with respect to the label 100 such that the contour of the image of the label 100 enters the left guide window A1 252. A first test image is taken by touching a button 257. Next, the user moves the portable terminal 250 with respect to the label 100 such that the contour of the image of the label 100 enters the right guide window A2 252. A second test image is taken by touching the button 257. The left guide window A1 252 is a window for obtaining a first test image taken from the front side of the label 100. The right guide window A2 252 is a window for obtaining a second test image taken by horizontally moving the portable terminal 250. Since the size of the label 100 is fixed, it is possible to guide the user so as to take the test images at the same distance as the distance between the label 100 and the registration camera 211 set when taking the registration images.

FIG. 23 shows another example of the portable terminal 250 in which two guide windows having different shapes are displayed on the display unit 258. A rectangular guide window A 252 and a trapezoidal guide window B 253 for use in taking two mutually-different images are displayed on the display unit 258. The user places the camera with respect to the label 100 such that the contour of the image of the label 100 enters the rectangular guide window A 252. A first test image is taken by touching a button 257. Next, the user moves and tilts the portable terminal 250 with respect to the label 100 such that the contour of the image of the label 100 enters the trapezoidal guide window B 253. A second test image is taken by touching the button 257. The trapezoidal guide window B 253 is a window for obtaining an image taken by the portable terminal 250 tilted such that the right side thereof is kept higher than the left side thereof. The size of the label 100 is fixed. Therefore, if the size of the trapezoidal guide window B 253 and the inclination of the upper and lower sides thereof are appropriately set, it is possible to guide the user so as to take the test images at the same conditions as the imaging conditions, i.e., the distance between the label 100 and the registration camera 211 and the tilt angle of the registration camera 211, which are used when taking the registration images.

FIG. 24 shows a further example of the portable terminal 250 in which two guide windows are alternately displayed on the display unit 258, one guide window at one time, so as to sequentially take two mutually-different test images of the label 100. First, only one guide window A 252 for guiding the user to take a test image at the upper side of the label 100 is displayed at the center of the display unit 258 of the portable terminal 250. A first test image is taken by touching the button 257 and is stored. Next, only one trapezoidal guide window B 253 for guiding the user to take a test image of the label 100 with a tilted camera is displayed at the center of the display unit 258 of the portable terminal 250. A second test image is taken by touching the button 257 and is stored.

In order to obtain images suitable for the image processing, the portable terminal according to the present invention displays a trapezoidal window on the display unit so that the user can take an image of the label at one side of the label with a camera tilted at a predetermined angle. Then, the light of the portable terminal is turned on and the focal point of the camera is adjusted prior to taking the image of the label.

Referring again to FIG. 21, the label-authenticating application program 259 of the portable terminal 250 takes two mutually-different test images under the same imaging conditions as the imaging conditions of the registration images through the use of the guide windows displayed according to one of the examples of the portable terminal 250 (S410). Next, the label-authenticating application program 259 generates two mutually-different normalized test images by normalizing the two test images of the label 100 thus taken (S420). Then, a test authentication code is generated using the two normalized test images. A label identification code contained in the pattern of the label identification code layer 14 of the label 100 is extracted from the normalized test images (S430). The label identification code contains the Internet address of the authentication server 220 or the Internet address of the directory server. Next, the number of the equal reflection region (ERRN) contained in the test authentication code is found by processing the test authentication code (S440). Subsequently, determination is made as to whether the number of the equal reflection region (ERRN) falls within a predetermined range (S450). If the number of the equal reflection region (ERRN) does not fall within the predetermined range, the label 100 is determined to be a copied label and the expression reading "copied label" is displayed on the display unit (S460). If the number of the equal reflection region (ERRN) falls within the predetermined range, the label-authenticating application program 259 requests the authentication server 220 to authenticate the label (S470). When requesting the label authentication, the test authentication code and the label identification code are transmitted to the authentication server 220. Next, an authentication result is received from the authentication server 220 (S480) and is displayed on the display unit (S490). If the label identification code contains the Internet address of the directory server 280 rather than the Internet address of the authentication server 220, the label identification code is transmitted to the directory server 280 and the address of the authentication server is received from the directory server 280. Upon receiving the address of the authentication server, the test authentication code and the label identification code are transmitted to the authentication server 220.

In the label-authenticating application program 259 described above, the step (S440) of finding the number of the equal reflection regions by comparing the two normalized test images, the step (S450) of determining whether the number of the equal reflection regions falls within a predetermined range and the step (S460) of, if the number of the equal reflection regions does not fall within the predetermined range, determining the label 100 to be a copied label and displaying the determination information on the display unit, are selectively applicable if such a need arises. In one embodiment, the label identification code may be extracted from one of the two mutually-different test images. The label identification code and the two mutually-different test images may be transmitted to the authentication server 220. In this case, determination is made as to whether the label identification code transmitted from the authentication server 220 is a registered label identification code. If the label identification code transmitted from the authentication server 220 is a registered label identification code, the received test images are normalized. A test authentication code is generated and is compared with the registration authentication code, thereby determining the copying or non-copying of the label.

Figure 25:
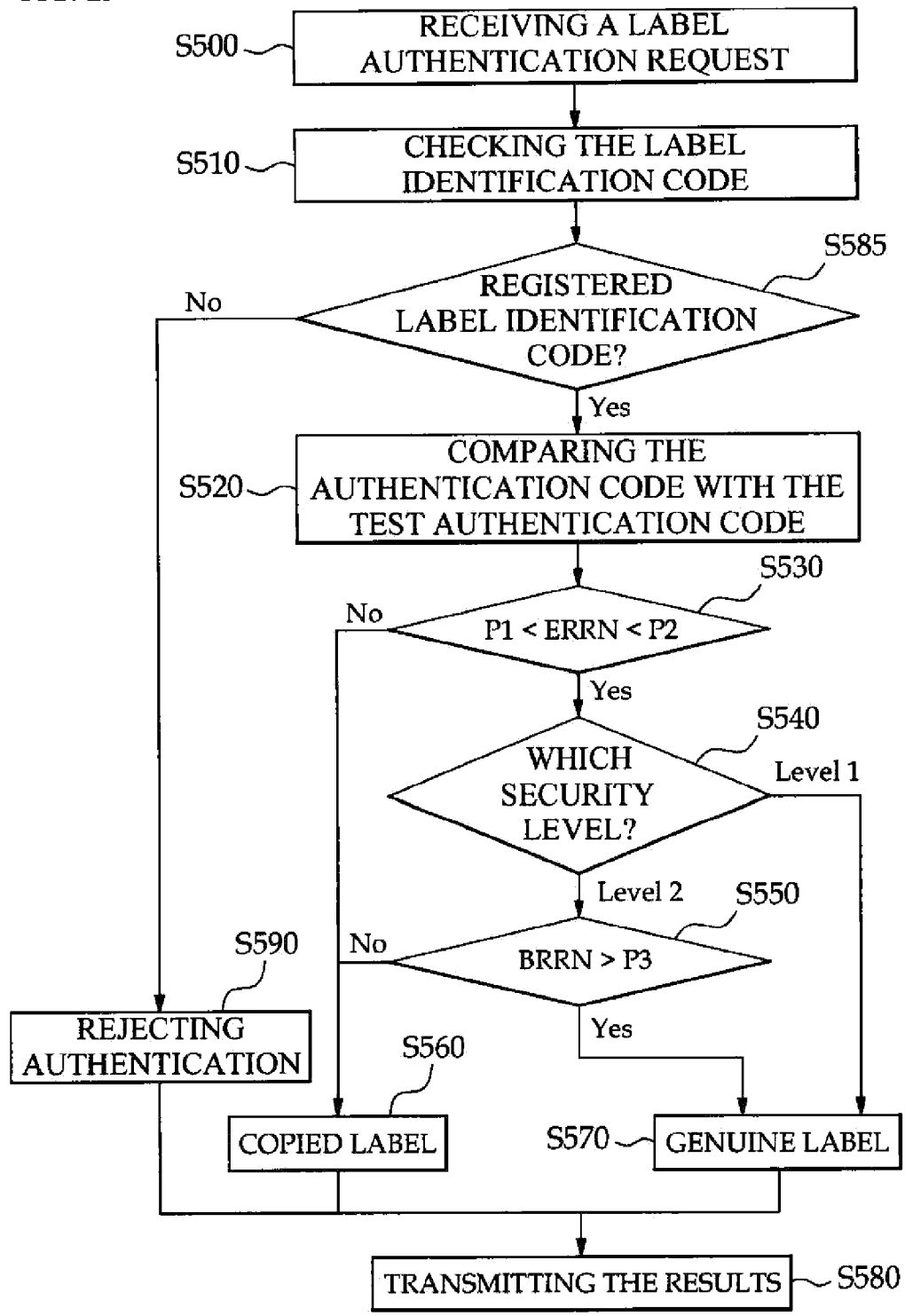
FIG. 25 is a flowchart illustrating a routine for determining the authenticity of a label, which is executed in a label authentication server according to the present invention.

FIG. 25 is a flowchart illustrating a routine for determining the authenticity of the label, which is executed in the authentication server according to the present invention. Description will now be made on a routine for performing the authentication of the label 100 in case where the authentication server 220 receives a request for the authentication of the label 100 from the portable terminal 250. If the authentication server 220 receives a request for the authentication of the label 100 from the portable terminal 250 (S500), the authentication server 220 checks whether the label identification code transmitted from the portable terminal 250 is the label identification code registered in the database of the authentication server 220 (S510). The label identification code for which authentication is requested by the portable terminal 250 is compared with the registered label identification code layer (S585). If the label identification code transmitted from the portable terminal 250 is not the registered label identification code, the authentication server 220 rejects authentication (S590) and transmits an authentication rejection message to the portable terminal 250 (S580). If it is determined that the label identification code transmitted from the portable terminal 250 is the registered label identification code, the registration authentication code of the label 100 is compared with the received test authentication code of the label 100 to find the number of the equal reflection regions having coincident grid coordinates (ERRN) and the number of the biased reflection regions having coincident grid coordinates (BRRN) (S520). In case where the authentication is performed at a first level (S540), the label 100 is determined to be a genuine label if the number of the equal reflection regions falls within a predetermined range (S570). The label 100 is determined to be a copied label if the number of the equal reflection regions does not fall within the predetermined range (S560). If the product having the label 100 is a high-priced product and if there is a need to perform the authentication at a one-step higher level (if the authentication is performed at a second level), determination is made as to whether the number of the biased reflection regions (BRRN) falls within a predetermined range (S550). If the number of the biased reflection regions (BRRN) falls within the predetermined range, the label 100 is determined to be a genuine label. If the number of the biased reflection regions (BRRN) does not fall within the predetermined range, the label 100 is determined to be a copied label. Upon finishing the authentication of the label 100, the authentication result is transmitted to the portable terminal 250.

Alternatively, for the purpose of increasing the security level of the label authentication, the label 100 may be authenticated by storing four mutually-different authentication codes of one label 100 in the authentication server 220. The four mutually-different authentication codes are found by normalizing the four registration image combinations (A,B), (A,C), (A,D) and (A,E) shown in FIG. 15. The four authentication codes of one label 100, which are generated in the label registration device 210 in advance, and the registration image combination information (or the image taking information), are stored in the database of the authentication server 220. Needless to say, a larger number of authentication codes may be generated using the five registration images shown in FIG. 15.

The portable terminal 250 may store four guide window combinations for use in taking test images corresponding to the four registration image combinations. When authenticating the label 100, the portable terminal 250 randomly selects one of the four guide window combinations and displays the selected guide window combination on the display unit 258. A user takes test images of the label 100 under the guidance of the guide window combination displayed on the display unit 258. The portable terminal 250 requests the authentication server 220 to authenticate the label 100 by transmitting the test authentication code generated using the two test images, the label identification code and the guide window combination information to the authentication server 220. The authentication server 220 identifies the label identification code. If the label 100 is a registered label, the authentication server 220 determines the authenticity of the label 100 by selecting the registration authentication code corresponding to the received guide window combination information from the four registration authentication codes of the label 100.

In case where the label 100 is authenticated using one authentication code, the orientation of the label 100 imaged by the guide window displayed on the display unit is constant. Accordingly, there is a possibility that one attempts to copy the label 100 in which the first reflection particles and the second reflection particles are distributed such that similar images are taken in a specified label imaging direction. However, if four authentication codes are used with respect to one label 100, it is difficult to predict which of the guide windows of the registration image combinations is to be displayed on the portable terminal 250 during the authentication of the label 100. Therefore, one who attempts to obtain a copied label should copy the label 100 such that similar images are taken in four directions. However, it is technically almost impossible to copy the label 100 in which the first reflection particles and the second reflection particles are distributed such that similar images are taken in four label-imaging directions. Thus, the copying of the label 100 becomes more difficult and the copying cost grows higher. This makes it possible to prevent copying of the label.

Sixth Invention

Computer-Readable Recording Medium which Stores a Program for Executing a Method for Authenticating a Product Authentication Label According to another aspect of the present invention, there is provided a computer-readable recording medium which stores a program for executing a method for authenticating a product authentication label 100. The recording medium according to the present invention may be a memory device which stores an authentication program of a portable terminal such as a smart phone or the like or may be a memory device which stores an authentication program of a server connected to the Internet to provide a service for downloading an application program. However, the recording medium is not limited thereto.

A method for authenticating a product authentication label executed by a program stored in the recording medium according to the present invention will be described with reference to FIGS. 16, 19 and 21.

First, a guide window for limiting an image of a label 100 displayed on the display unit 258 is displayed on the display unit 258 in order to limit the relative position between the label and the camera 251 when imaging the label 100 with the camera 251 (S400). Different examples of the portable terminal 250 for displaying the guide window are shown in FIGS. 22 to 24. Next, the position of the camera with respect to the label 100 is adjusted under the guidance of the guide window. Test images are taken by touching the button 257 of the display unit 258 (S410). The mutually-different test images taken by the camera 251 are normalized (S420). Next, a label identification code is extracted from the normalized test images and a test authentication code is generated (S430). The test authentication code is generated by finding a difference in brightness between grid coordinates corresponding to the normalized test images, giving a code value that classifies the grid coordinates into equal reflection regions to the grid coordinates if the difference in brightness falls within a predetermined value range, and giving a code value that classifies the grid coordinates into biased reflection regions to the grid coordinates if the difference in brightness is larger than a predetermined value. Next, the label identification code and the test authentication code are transmitted to the authentication server connected to the Internet, thereby requesting the authentication server to authenticate the label (S470). Upon receiving a label authentication result from the authentication server, the authentication result is displayed on the display unit (S490).

As shown in FIGS. 22 to 23, the guide window displayed on the display unit is preferably formed into such a shape as to limit the edge of the label image taken by the camera, so that a user can bring the edge of the label image into the guide window by adjusting the distance between the camera 251 and the label 100 and the tilt angle of the camera 251. The trapezoidal guide window is used to guide the user so as to take a test image with the camera tilted at a predetermined angel with respect to the label, just like the test image P2'(i,j) shown in FIG. 11B. As shown in FIG. 24, for the purpose of sequentially taking different test images, a guide window A 252 for use in taking a test image of the label 100 at the upper side of the label 100 is first displayed at the center of the display unit 258. Next, a trapezoidal guide window B 253 for use in taking a test image of the label 100 with the camera tilted at a predetermined angle is displayed at the center of the display unit 258. In the step of displaying the guide window on the display unit, one of the guide window data which define the arrangement state of the camera with respect to the label for obtaining the mutually-different test images may be randomly selected and displayed on the display unit.

Furthermore, the program for executing a method for authenticating a product authentication label, which is recorded in a computer-readable recording medium according to the present invention, may be configured to determine the authenticity of the label by directly processing the test images prior to generating the test authentication code and requesting the authentication server to authenticate the label. The program for executing a method for authenticating a product authentication label, which is recorded in a computer-readable recording medium according to the present invention, includes a step of displaying, on the display unit, a guide window for limiting a label image displayed on the display unit, in order for a user to limit the relative position of the label and the camera when imaging the label with the camera, a step of normalizing a plurality of mutually-different test images taken by the camera, a step of finding a difference in brightness between grid coordinates corresponding to the normalized test images and finding the number of equal reflection particles whose difference in brightness falls within a predetermined number range, a step of determining the label to be a copied label if the number of equal reflection particles does not fall within the predetermined number range, and a step of displaying a determination result on the display unit.

The program for executing a method for authenticating a product authentication label, which is recorded in a computer-readable recording medium according to the present invention, may be configured to extract only the label identification information from the taken label images, transmit all the label images to the authentication server and display only the authentication result transmitted from the authentication server on the display unit. The program for executing a method for authenticating a product authentication label, which is recorded in a computer-readable recording medium according to the present invention, includes a step of displaying, on the display unit, a guide window for limiting a label image displayed on the display unit, in order for a user to limit the relative position of the label and the camera when imaging the label with the camera, a step of extracting a label identification code from one of a plurality of mutually-different label images taken under the guidance of the guide window of the display unit, a step of transmitting the extracted label identification code and the label images to the authentication server connected to the Internet, and a step of receiving a label authentication result from the authentication server and displaying the label authentication result on the display unit.

What is claimed is:
1. A product authentication label comprising:
   a carrier layer made of a transparent or translucent material;
   a plurality of first reflection pattern forming bodies disposed in the carrier layer and configured to reflect a substantially identical reflection pattern regardless of the direction of irradiated light;
   a plurality of second reflection pattern forming bodies randomly disposed in the carrier layer and configured to reflect a reflection pattern which varies depending on the direction of irradiated light;
   a transparent synthetic resin film attached to one surface of the carrier layer; and
   a label identification code layer laminated on one surface of the film on which the carrier layer is attached, the label identification code layer disposed so as to surround at least a portion of the carrier layer,
   wherein label identification code layer includes a reference region which indicates a reference point of a taken image, an identification code region which indicates identification information including information on a product and information on a manufacturer, and a plurality of division reference points which indicates reference points of division lines for dividing the carrier layer into a virtual grid shape.

2. The product authentication label of claim 1,
   wherein the first reflection pattern forming bodies include a plurality of first reflection particles randomly disposed in the carrier layer, each of the first reflection particles having a smooth surface, and
   wherein the second reflection pattern forming bodies include a plurality of second reflection particles disposed in the carrier layer, each of the second reflection particles having a plurality of reflection surfaces formed so as to reflect light is a specific direction.

3. The product authentication label of claim 1,
   wherein each of the first reflection particles has a spherical shape and includes a metal layer coated on a surface thereof, and
   wherein each of the second reflection particles has a sheet shape and includes a metal layer coated on a surface thereof.

4. The product authentication label of claim 1,
   wherein a pattern which indicates label reference points is formed in the reference region of the label identification code layer, and a two-dimensional pattern which codes the label identification information is formed in the identification code region.

5. A method for generating an authentication code of a product authentication label, comprising:
   a step of taking, with a camera, a plurality of mutually-different images of a product authentication label including a plurality of first reflection pattern forming bodies configured to reflect a substantially identical reflection pattern regardless of the direction of irradiated light and a plurality of second reflection pattern forming bodies randomly disposed and configured to reflect a reflection pattern which varies depending on the direction of irradiated light;
   a step of normalizing the images of the product authentication label; and
   a step of finding a difference in brightness between grid coordinates corresponding to the normalized images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value.

6. The method of claim 5, further comprising:

a step of giving a third code value that classifies the grid coordinates into blank regions to the grid coordinates if the difference in brightness between grid coordinates corresponding to the normalized images is equal to or smaller than the predetermined value.

7. A method for authenticating a product authentication label including a plurality of first reflection pattern forming bodies configured to reflect a substantially identical reflection pattern regardless of the direction of irradiated light and a plurality of second reflection pattern forming bodies randomly disposed and configured to reflect a reflection pattern which varies depending on the direction of irradiated light, the method comprising:

a step of taking a plurality of mutually-different registration images of the label and generating a registration authentication code for the registration images by the method of claim 5;

a step of taking a plurality of mutually-different test images of the label and generating a test authentication code for the test images by the method of claim 5; and a step of comparing the registration authentication code with the test authentication code, calculating the number of grid coordinates having a coincident first code value, and determining the label to be a genuine label if the number of grid coordinates having a coincident first code value falls within a predetermined value range.

8. The method of claim 7, further comprising:

a step of comparing the registration authentication code with the test authentication code, calculating the number of grid coordinates having a coincident second, code value, and determining the label to be a genuine label if the number of grid coordinates having a coincident second code value falls within a predetermined value range.

9. The method of claim 7, wherein the test images corresponding to the registration images are taken under the same camera arrangement conditions as the camera arrangement conditions used in taking the registration images.

10. The method of claim 7, wherein at least one of the test images includes one of the registration images.

11. A system for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, the system comprising:

a label registration device including a first camera and an image processing module for generating a registration authentication code by processing a plurality of mutually-different registration images of the label taken with the first camera by the method of claim 5;

a label reader including a second camera, an image processing module for generating a test authentication code by processing a plurality of mutually-different test images of an arbitrary label taken with the second camera by the method of claim 5, and a display unit for displaying a label authentication result; and a label authentication server, wherein the label authentication server is configured to perform:

a step of receiving a label identification code and a registration authentication code of the label from the label registration device and storing the label identification code and the registration authentication code in a database;

a step of receiving a label identification code and a test authentication code of an arbitrary label from the label reader and receiving a label authentication request from the label reader;

a step of confirming whether the label identification code of the arbitrary label received from the label reader is the label identification code registered in the database;

a step of, with respect to the label identification code whose registration is confirmed, comparing the registration authentication code with the test authentication code, calculating the number of grid coordinates having a coincident first code value, determining the label to be a genuine label if the number of grid coordinates having a coincident first code value falls within a predetermined value range, and determining the label to be a copied label if the number of grid coordinates having a coincident first code value does not fall within the predetermined value range; and a step of transmitting a result of the determination to the label reader.

12. The system of claim 11, wherein the label authentication server is configured to further perform: a step of, with respect to the label identification code whose registration is confirmed, comparing the registration authentication code with the test authentication code, calculating the number of grid coordinates having a coincident second code value, determining the label to be a genuine label if the number of grid coordinates having a coincident second code value falls within a predetermined value range, and determining the label to be a copied label if the number of grid coordinates having a coincident second code value does not fall within the predetermined value range.

13. The system of claim 11, wherein the label reader is configured to calculate the number of grid coordinates having a first code value with respect to the test authentication code, determine the label to be a copied label if the number of grid coordinates having a first code value does not fall within a predetermined value range, and displays a result of the determination on the display unit.

14. The system of claim 11, wherein each of the label registration device and the label reader includes a plurality of cameras, and the cameras of the label registration device and the cameras of the label reader are installed under the same arrangement conditions with respect to the label.

15. The system of claim 11, wherein the label reader is configured to display, on the display unit, a guide window for guiding a user to take the test images.

16. The system of claim 15, wherein the guide window displayed on the display unit of the label reader is a guide window for limiting an edge of a label image taken with the second camera.

17. The system of claim 15, wherein the guide window displayed on the display unit of the label reader has a trapezoidal shape.

18. A system for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, the system comprising:

a label registration device including a first camera and an image processing module for generating a registration authentication code by processing a plurality of mutually-different registration images of the label taken with the first camera by the method of claim 5;

a label reader including a second camera, an image processing module for processing a plurality of mutually-different test images of an arbitrary label taken with the second camera, and a display unit for displaying a label authentication result; and a label authentication server, wherein the label authentication server is configured to perform:

a step of receiving a label identification code and a registration authentication code of the label from the label registration device and storing the label identification code and the registration authentication code in a database;

a step of receiving a label identification code of an arbitrary label and a plurality of mutually-different test images from the label reader and receiving a label authentication request from the label reader;

a step of confirming whether the label identification code received from the label reader is the label identification code registered in the database;

a step of, with respect to the label identification code whose registration is confirmed, generating a test authentication code by processing the test images by the method of claim 5;

a step of comparing the registration authentication code with the test authentication code, calculating the number of grid coordinates having a coincident first code value, determining the label to be a genuine label if the number of grid coordinates having a coincident first code value falls within a predetermined value range, and determining the label to be a copied label if the number of grid coordinates having a coincident first code value does not fall within the predetermined value range; and a step of transmitting a result of the determination to the label reader.

19. The system of claim 18, wherein the label authentication server is configured to further perform: a step of, with respect to the label identification code whose registration is confirmed, comparing the registration authentication code with the test authentication code, calculating the number of grid coordinates having a coincident second code value, determining the label to be a genuine label if the number of grid coordinates having a coincident second code value falls within a predetermined value range, and determining the label to be a copied label if the number of grid coordinates having a coincident second code value does not fall within the predetermined value range.

20. The system of claim 18, wherein the label reader is configured to calculate the number of grid coordinates having a first code value with respect to the test authentication code, determine the label to be a copied label if the number of grid coordinates having a first code value does not fall within a predetermined value range, and displays a result of the determination on the display unit.

21. The system of claim 18, wherein each of the label registration device and the label reader, includes a plurality of cameras, and the cameras of the label registration device and the cameras of the label reader, are installed under the same arrangement conditions with respect to the label.

22. The system of claim 18, wherein the label reader is configured to display, on the display unit, a guide window for guiding a user to take the test images.

23. The system of claim 22, wherein the guide window displayed on the display unit of the label reader is a guide window for limiting an edge of a label image taken with the second camera.

24. The system of claim 23, wherein the guide window displayed on the display unit of the label reader has a trapezoidal shape.

25. A portable terminal for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, the terminal comprising:

a control unit;

a display unit;

a camera; and a memory device which stores a label-authenticating application program to be executed in the control unit, wherein the label-authenticating application program includes:

a step of displaying, on the display unit, a guide window for limiting a label image displayed on the display unit, in order for a user to limit the relative position of the label and the camera when imaging the label with the camera;

a step of normalizing a plurality of mutually-different label images guided into the guide window of the display unit and taken by the camera;

a step of extracting the label identification code and the test images from the normalized label images;

a step of finding a difference in brightness between grid coordinates corresponding to the extracted test images and calculating the number of grid coordinates whose difference in brightness falls within a predetermined value range;

a step of determining the label to be a copied label if the number of grid coordinates whose difference in brightness falls within the predetermined value range does not fall within a predetermined value range; and a step of displaying a result of the determination on the display unit.

26. The terminal of claim 25, wherein the guide window is a guide window for guiding a user to take the label images with the camera tilted with respect to the label, and the label-authenticating application program further includes: a step of turning on a light of the portable terminal and adjusting a focal point of the camera.

27. A portable terminal for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, the terminal comprising:

a control unit;

a display unit;

a camera; and a memory device which stores a label-authenticating application program to be executed in the control unit, wherein the label-authenticating application program includes:

a step of displaying, on the display unit, a guide window for limiting a label image displayed on the display unit, in order for a user to limit the relative position of the label and the camera when imaging the label with the camera;

a step of extracting the label identification code from label images guided into the guide window of the display unit and taken by the camera;

a step of transmitting the extracted label identification code and the taken label images to a label authentication server connected to the Internet; and a step of receiving a label authentication result from the label authentication server and displaying the label authentication result on the display unit.

28. The terminal of claim 27, wherein the guide window is a guide window for guiding a user to take the label images with the camera tilted with respect to the label, and the label authenticating application program further includes: a step of turning on a light of the portable terminal and adjusting a focal point of the camera.

29. The terminal of claim 27, wherein the guide window displayed on the display unit is a guide window for limiting an edge of each of the label images taken with the camera.

30. The terminal of claim 29, wherein the memory device stores a plurality of guide window data which defines an arrangement state of the camera with respect to the label in order to obtain a plurality of mutually-different test images of the label, and the step of displaying, the guide window on the display unit includes a step of randomly selecting one of the guide window data displaying the selected guide window data on the display unit.

31. A portable terminal for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, the terminal comprising:

a control unit;

a display unit;

a camera; and a memory device which stores a label-authenticating application program to be executed in the control unit, wherein the label-authenticating application program includes:

a step of displaying, on the display unit, a guide window for limiting a label image displayed on the display unit, in order for a user to limit the relative position of the label and the camera when imaging the label with the camera;

a step of turning on a light of the portable terminal and adjusting a focal point of the camera;

a step of normalizing a plurality of mutually-different images guided into the guide window of the display unit and taken by the camera;

a step of extracting a label identification code and test images from the normalized images;

a step of generating a test authentication code for the test images of the label by finding a difference in brightness between grid coordinates corresponding to the extracted test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value;

a step of transmitting the label identification code and the test authentication code to a label authentication server connected to the Internet; and a step of receiving a label authentication result from the label authentication server and displaying the label authentication result on the display unit.

32. A computer-readable recording medium which stores a program for executing a method for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, wherein the method for authenticating a product authentication label comprises:

a step of displaying, on a display unit, a guide window for limiting a label image displayed on the display unit, in order for a user to limit the relative position of the label and a camera when imaging the label with the camera;

a step of normalizing a plurality of mutually-different label images guided into the guide window of the display unit and taken by the camera;

a step of extracting a label identification code and test images from the normalized label images;

a step of finding a difference in brightness between grid coordinates corresponding to the extracted test images and calculating the number of grid coordinates whose difference in brightness falls within a predetermined value range;

a step of determining the label to be a copied label if the number of grid coordinates whose difference in brightness falls within the predetermined value range does not fall within a predetermined value range; and a step of displaying a result of the determination on the display unit.

33. A computer-readable recording medium which stores a program for executing a method for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, wherein the method for authenticating a product authentication label comprises:

a step of displaying, on a display unit, a guide window for limiting a label image displayed on the display unit, in order for a user to limit the relative position of the label and a camera when imaging the label with the camera;

a step of extracting the label identification code from one of a plurality of mutually-different label images guided into the guide window of the display unit and taken by the camera;

a step of transmitting the extracted label identification code and the taken label images to a label authentication server connected to the Internet; and a step of receiving a label authentication result from the label authentication server and displaying the label authentication result on the display unit.

34. A computer-readable recording medium which stores a program for executing a method for authenticating a product authentication label including a plurality of first reflection pattern forming bodies configured to reflect a substantially identical reflection pattern regardless of the direction of irradiated light, a plurality of second reflection pattern forming bodies randomly disposed and configured to reflect a reflection pattern which varies depending on the direction of irradiated light, and a label authentication code, wherein the method for authenticating a product authentication label comprises:

a step of displaying, on a display unit, a guide window for limiting a label image displayed on the display unit, in order for a user to limit the relative position of the label and a camera when imaging the label with the camera;

a step of normalizing a plurality of mutually-different images guided into the guide window of the display unit and taken by the camera;

a step of extracting a label identification code and test images from the normalized images;

a step of generating a test authentication code for the test images of the label by finding a difference in brightness between grid coordinates corresponding to the extracted test images, giving a first code value that classifies the grid coordinates into equal reflection regions to the grid coordinates if the difference in brightness falls within a predetermined value range, and giving a second code value that classifies the grid coordinates into biased reflection regions to the grid coordinates if the difference in brightness is larger than a predetermined value;

a step of transmitting the label identification code and the test authentication code to a label authentication server connected to the Internet; and a step of receiving a label authentication result from the label authentication server and displaying the label authentication result on the display unit.

* * * * *